(12) United States Patent
Tsukuda et al.

(10) Patent No.: US 9,491,410 B2
(45) Date of Patent: Nov. 8, 2016

(54) APPARATUS AND METHOD FOR INFORMATION PROCESSING AND PROGRAM

(71) Applicant: SONY CORPORATION, Tokyo (JP)

(72) Inventors: Kazuma Tsukuda, Kanagawa (JP); Nobuhiro Tsurumaki, Kanagawa (JP); Masaki Demizu, Kanagawa (JP); Masafumi Suzuki, Tokyo (JP); Yoichi Kasahara, Tokyo (JP); Katsuyoshi Kanemoto, Chiba (JP); Hideo Miyamaki, Tokyo (JP); Takumi Sugaya, Kanagawa (JP); Shin Yanai, Tokyo (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 13/862,077

(22) Filed: Apr. 12, 2013

(65) Prior Publication Data
US 2013/0242094 A1    Sep. 19, 2013

Related U.S. Application Data

(63) Continuation of application No. 12/424,966, filed on Apr. 16, 2009.

(30) Foreign Application Priority Data

Apr. 28, 2008   (JP) ................... 2008-117468

(51) Int. Cl.
*H04N 7/18*    (2006.01)
*H04N 5/225*    (2006.01)
(Continued)

(52) U.S. Cl.
CPC .......... *H04N 7/18* (2013.01); *G08B 13/19682* (2013.01); *H04N 7/181* (2013.01);
(Continued)

(58) Field of Classification Search
CPC ............ H04N 5/23203; H04N 21/485; H04N 7/181; H04N 21/4223; H04N 11/042; H04N 2201/3277; G06F 9/4411
USPC ......................................... 348/143
See application file for complete search history.

(56) References Cited

U.S. PATENT DOCUMENTS 6,134,019 A * 10/2000 Wantuck, Jr. ...... G03G 15/5016
                                                        358/1.13
6,163,816 A * 12/2000 Anderson .......... H04N 1/00204
                                                        348/E5.042

(Continued)

FOREIGN PATENT DOCUMENTS

JP        9-98331     4/1997
JP        11-187383   7/1999
(Continued)

OTHER PUBLICATIONS

M. D. Grossberg and S. K. Nayar, "Modeling the space of camera response functions," in IEEE Transactions on Pattern Analysis and Machine Intelligence, vol. 26, No. 10, pp. 1272-1282, Oct. 2004.*
(Continued)

*Primary Examiner* — Taylor Elfervig
(74) *Attorney, Agent, or Firm* — Oblon, McClelland, Maier & Neustadt, L.L.P.

(57) ABSTRACT

An information processing apparatus includes an acquisition unit configured to acquire restriction information about imaging functions from an imaging device connected to a network, a setting control unit configured to display a setting window in which after a parameter for one imaging function is selected, selectable parameters for other imaging functions are restricted in accordance with the selected parameter on the basis of the restriction information so that the imaging functions to be used are selected, and an information processing unit configured to acquire image information about an image captured using the selected imaging functions via the network.

18 Claims, 18 Drawing Sheets

(51) Int. Cl.
  *H04N 5/232* (2006.01)
  *H04N 5/76* (2006.01)
  *G08B 13/196* (2006.01)
  *H04N 21/4223* (2011.01)
  *H04N 11/04* (2006.01)
  *G06F 9/44* (2006.01)
  *H04N 21/485* (2011.01)

(52) U.S. Cl.
  CPC ........ *G06F 9/4411* (2013.01); *H04N 5/23203* (2013.01); *H04N 11/042* (2013.01); *H04N 21/4223* (2013.01); *H04N 21/485* (2013.01); *H04N 2201/3277* (2013.01)

(56) References Cited

U.S. PATENT DOCUMENTS

| | | |
|---|---|---|
| 6,404,445 B1 | 6/2002 | Galea et al. |
| 8,274,559 B2 * | 9/2012 | Amling et al. ................ 348/72 |
| 2004/0027461 A1 | 2/2004 | Boyd |
| 2004/0218201 A1 | 11/2004 | Lermant et al. |
| 2007/0126875 A1 * | 6/2007 | Miyamaki ................ 348/207.11 |
| 2007/0195350 A1 * | 8/2007 | Hattori ........................ 358/1.13 |

FOREIGN PATENT DOCUMENTS

| | | |
|---|---|---|
| JP | 2003-50989 | 2/2003 |
| JP | 2004-357206 | 12/2004 |
| JP | 2008-15566 | 1/2008 |
| JP | 2008-48243 | 2/2008 |

OTHER PUBLICATIONS

"Focused image recovery from two defocused images recorded with different camera settings," in IEEE Transactions on Image Processing, vol. 4, No. 12, pp. 1613-1628, Dec. 1995.*

M. D. Grossberg and S. K. Nayar, "What is the space of camera response functions?," Computer Vision and Pattern Recognition, 2003. Proceedings. 2003 IEEE Computer Society Conference on, 2003, pp. II-602-9 vol. 2.*

* cited by examiner

APPARATUS AND METHOD FOR INFORMATION PROCESSING AND PROGRAM

CROSS REFERENCES TO RELATED APPLICATIONS

This application is a continuation of, and claims the benefit of priority under 35 U.S.C.§120 to, U.S. application Ser. No. 12/424,966, filed Apr. 16, 2009, which claims the benefit of priority under 35 U.S.C. §119 to Japanese Priority Patent Application JP 2008-117468 filed Apr. 28 2008. The entire contents of each of the foregoing application is hereby incorporated by reference into the present application.

BACKGROUND OF THE INVENTION

1. Field of the Invention

The present invention relates to an information processing apparatus and method for acquiring image information from an imaging device via a network and a program.

2. Description of the Related Art

New surveillance camera systems using Internet Protocol (IP) transmission have been commercially manufactured, so that large-scale systems can be constructed. As for a compression method (codec) upon IP transmission, for example, the JPEG (Joint Photographic Experts Group) method and the MPEG (Moving Picture Experts Group) method are used in most cases. The JPEG and MPEG methods are generally used in fields other than that of surveillance cameras. The JPEG method is effective in cases where a large number of surveillance cameras result in a lower frame rate. The MPEG method is effective in cases where a user wants to view a moving image even when an image resolution is decreased.

Software installed in a recorder has been changed and released every new camera release. Updating the software permits a new camera to be registered and set in the recorder.

FIG. 18 is a diagram explaining a method of registering and setting a camera in a related-art camera system. A camera 500 holds device information about itself in a storage unit 501. A recorder 600 holds information blocks 603a and 603b about functions of a known camera. The recorder 600 can additionally store information about a function of the known camera by changing software. The information about the functions of the camera contains the following items:

Functions supported by the camera;
List of parameters necessary for setting each function and set ranges for the parameters; and
Restrictions on the individual functions.

Each time another new camera 500 is released, the recorder 600 additionally stores information specific to the new device. To use the camera 500 and the recorder 600 such that the camera 500 is connected to the recorder 600 over a network, the camera 500 has to be first registered in the recorder 600. At that time, the recorder 600 acquires device information indicating, for example, the model name from the camera 500 using, for instance, a common gateway interface (CGI) command. The recorder 600 then refers to the information blocks 603a and 603b about the functions of the camera on the basis of the device name, thereby constructing registration information concerning the camera 500. Specifically, restriction information blocks 604a and 604b about restrictions on the individual functions and ranges of set values for the respective functions are set on the basis of the device information and the information blocks 603a and 603b about the respective functions of the camera. Thus, a function a 602a and a function b 602b can be realized.

Japanese Unexamined Patent Application Publication Nos. 2008-15566 and 2008-48243 disclose related-art surveillance camera systems.

SUMMARY OF THE INVENTION

According to a related-art method of registering and setting a camera, each time a new camera is released, it is necessary to update software and additionally store information about the new camera on a recorder. Accordingly, fears are rising that the storage capacity of the recorder has to be increased.

In addition, it is difficult for the recorder to control an unknown camera. If the user manually registers the unknown camera into the recorder, the user has to set functions supported by the camera and a set range for each parameter in consideration of details of the respective functions and the set ranges of values.

The present invention has been proposed in consideration of the above-described circumstances. It is desirable to provide an information processing apparatus and method capable of easily using an unknown imaging device and a program.

According to an embodiment of the present invention, an information processing apparatus includes an acquisition unit configured to acquire restriction information about imaging functions from an imaging device connected to a network, a setting control unit configured to display a setting window in which after a parameter for one imaging function is selected, selectable parameters for other imaging functions are restricted in accordance with the selected parameter on the basis of the restriction information so that the imaging functions to be used are selected, and an information processing unit configured to acquire image information about an image captured using the selected imaging functions via the network.

According to another embodiment of the present invention, a method for information processing includes the steps of: acquiring restriction information about imaging functions from an imaging device connected to a network, displaying a setting window in which after a parameter for one imaging function is selected, selectable parameters for other imaging functions are restricted in accordance with the selected parameter on the basis of the restriction information so that the imaging functions to be used are selected, and acquiring image information about an image captured using the selected imaging functions via the network.

According to another embodiment of the present invention, a program allows a computer to perform acquiring restriction information about imaging functions from an imaging device connected to a network, displaying a setting window in which after a parameter for one imaging function is selected, selectable parameters for other imaging functions are restricted in accordance with the selected parameter on the basis of the restriction information so that the imaging functions to be used are selected, and acquiring image information about an image captured using the selected imaging functions via the network.

According to any of the embodiments of the present invention, the setting window in which after a parameter for one imaging function is selected, selectable parameters for other imaging functions are restricted in accordance with the selected parameter on the basis of the restriction information about the imaging functions acquired via the network is displayed. Thus, a user operation for setting an unknown imaging device can be simplified, so that the unknown imaging device can be easily used.

DESCRIPTION OF THE PREFERRED EMBODIMENTS

Embodiments of the present invention will be described in detail below with reference to the drawings.

Figure 1:
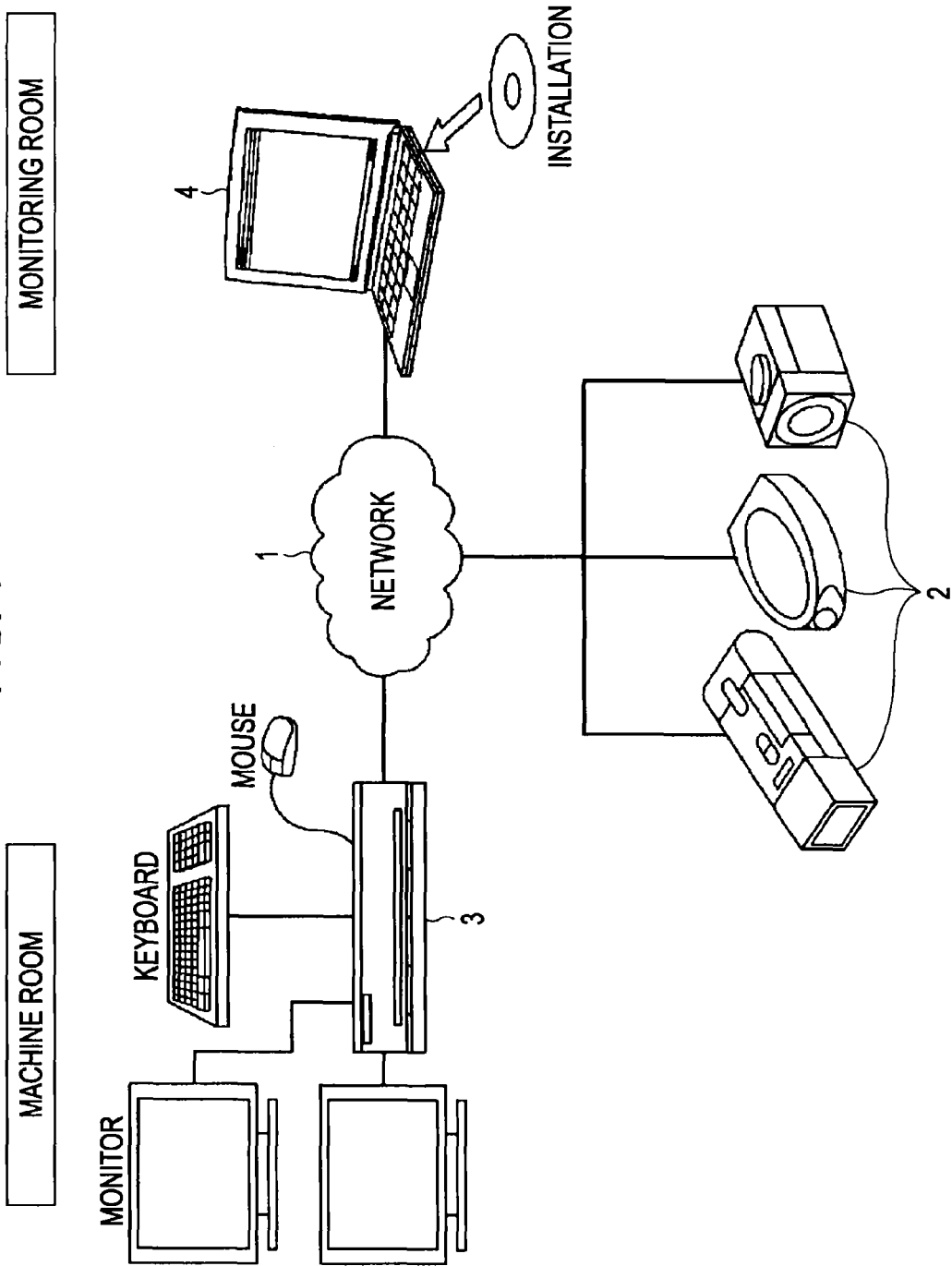
FIG. 1 is a diagram illustrating an exemplary structure of a surveillance camera system according to an embodiment of the present invention.

FIG. 1 illustrates an exemplary structure of a surveillance camera system. The surveillance camera system includes a plurality of surveillance cameras 2 connected to a network 1, a recorder 3, and a computer 4. The recorder 3 monitors, records, and plays video images and sounds captured by the surveillance cameras 2 through the network. On the computer 4, application software for remote-controlling operations similar to those by the recorder through the network 1 is installed.

When such a surveillance camera system utilizes, for example, the IP, the system can be constructed on a large scale such that the recorder 3 is disposed in a machine room and the computer 4 is placed in a monitoring room.

Figure 2:
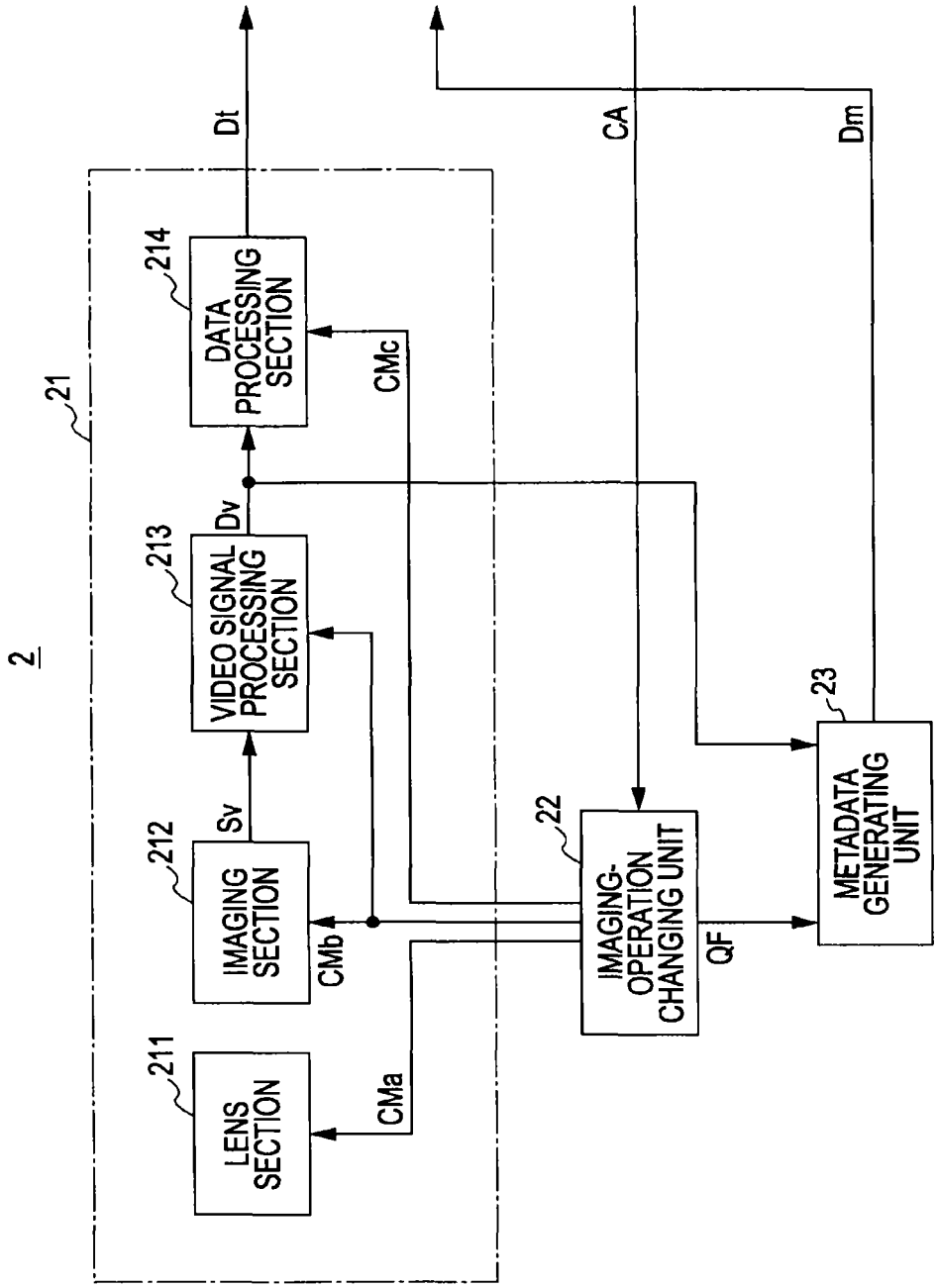
FIG. 2 is a block diagram of an exemplary configuration of a surveillance camera.

FIG. 2 is a block diagram illustrating an exemplary configuration of each surveillance camera 2. The surveillance camera 2 includes a video data generating unit 21, an imaging-operation changing unit 22, and a metadata generating unit 23. The video data generating unit 21 includes a lens section 211, an imaging section 212, a video signal processing section 213, and a data processing section 214.

The imaging section 212 photoelectrically converts light corresponding to an image formed on an imager (not illustrated) through the lens section 211 to generate a video signal Sv.

The video signal processing section 213 performs various signal processing operations on the video signal Sv supplied from the imaging section 212 to generate video data Dv. For example, the signal processing section 213 performs knee correction in which the level of the video signal Sv is at or above a predetermined value, the signal is compressed, $\gamma$ correction in which the level of the video signal Sv is corrected in accordance with a set $\gamma$ curve, and white-clip processing or black-clip processing in which the signal level of the video signal Sv is restricted within a predetermined range.

The data processing section 214 performs coding on the video data Dv in order to reduce the amount of data upon communication with the recorder 3 and the computer 4, thus generating video data Dt.

The imaging-operation changing unit 22 changes an operation of each surveillance camera 2 in accordance with a change instruction signal CA supplied from the recorder 3 or the computer 4 so as to capture an optimum video image. In addition, the imaging-operation changing unit 22 performs various processes, for example, shifting the imaging direction of the imaging section 212, supplying a control signal CMa to the lens section 211 so that the zoom ratio or the diameter of the iris diaphragm is changed, supplying a control signal CMb to the imaging section 212 and the signal processing section 213 so that the frame rate of captured video images is changed, and supplying a control signal CMc to the data processing section 214 so that the compression ratio of video data is changed.

The metadata generating unit 23 generates metadata Dm including information about a surveillance target. When the surveillance target is a moving object, the metadata generating unit 23 detects a moving object using the video data Dv generated by the video data generating unit 21, generates moving-object detection information indicating whether the moving object is detected and moving-object position information indicating the position of the detected moving object, and includes these information items as object information items in the metadata. Unique IDs are assigned to detected objects, respectively.

Metadata generated in each surveillance camera will now be described. The metadata is attribute information related to video data captured by the imaging section 212 in the surveillance camera 2 and includes the following items:

Object information (e.g., the ID, coordinates, and size of a moving object detected by the surveillance camera);

Capture time data and orientation information (pan, tilt) of the surveillance camera;

Position information of the surveillance camera; and

Signature information of captured image.

The "object information" is obtained by expanding information described as binary data in the metadata into a meaningful data structure.

Figure 3:
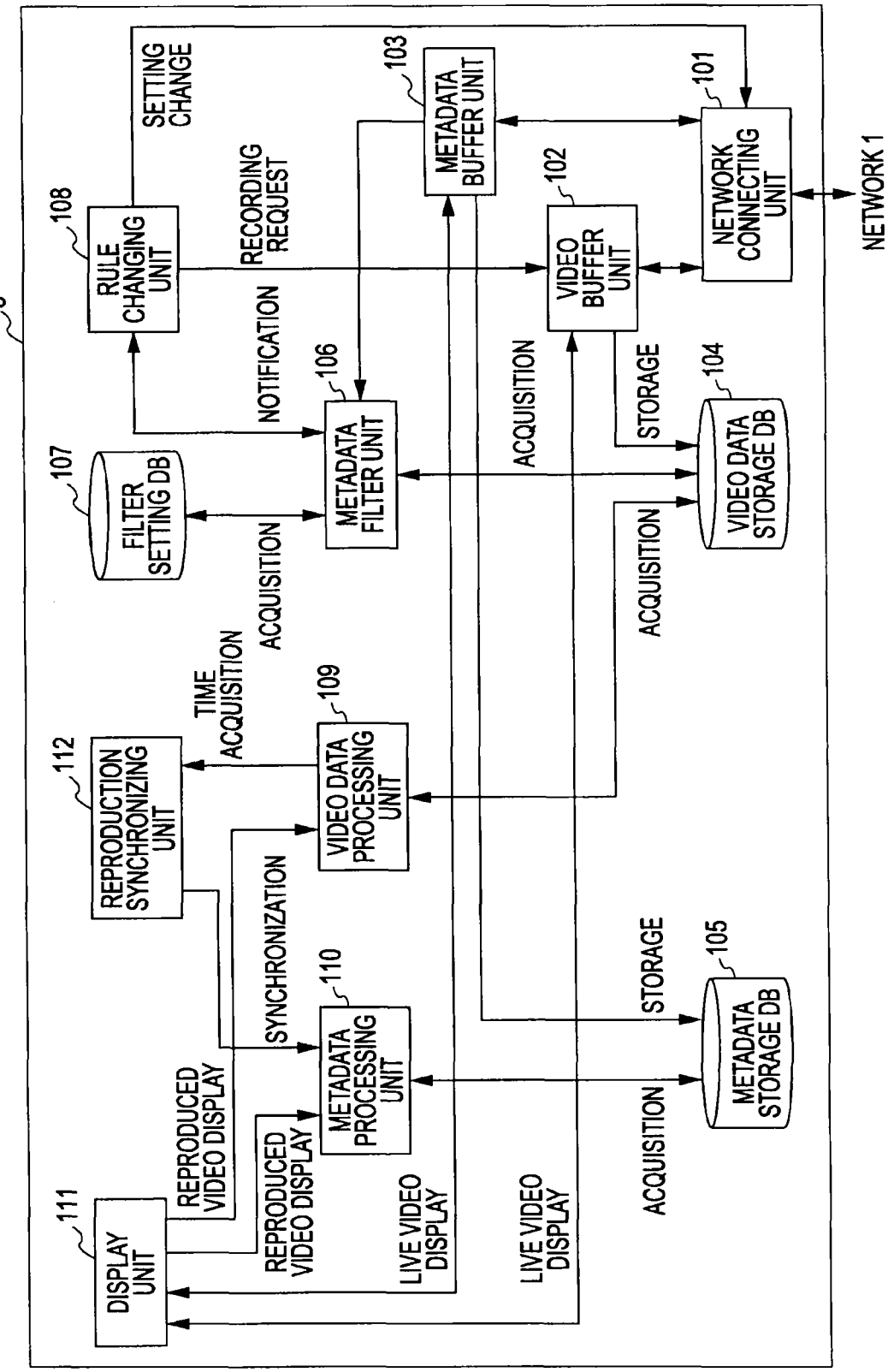
FIG. 3 is a block diagram illustrating an exemplary configuration of a recorder.

FIG. 3 is a block diagram illustrating an exemplary configuration of the recorder 3. The recorder 3 includes a network connecting unit 101, a video buffer unit 102, a metadata buffer unit 103, a filter setting database (DB) 107, a metadata filter unit 106, a rule changing unit 108, a video data storage database (DB) 104, a metadata storage database (DB) 105, a display unit 111, a video data processing unit 109, a metadata processing unit 110, and a reproduction synchronizing unit 112. The network connecting unit 101 performs data transmission with each surveillance camera 2. The video buffer unit 102 acquires video data from the surveillance camera 2. The metadata buffer unit 103 acquires metadata from the surveillance camera 2. The filter setting database 107 stores filter setting based on filtering. The metadata filter unit 106 functions as a filter unit for filtering metadata. The rule changing unit 108 sends information indicative of setting change to the surveillance camera 2. The video data storage database 104 stores video data. The metadata storage database 105 stores metadata. The display unit 111 displays video data and metadata. The video data processing unit 109 performs processing for reproducing video data on the display unit 111. The metadata processing unit 110 performs processing for reproducing metadata on the display unit 111. The reproduction synchronizing unit 112 synchronizes the reproduction of metadata with that of video data.

The video buffer unit 102 acquires video data from the surveillance camera 2 and decodes the video data which is encoded. The video buffer unit 102 holds the resultant video data and sequentially supplies the video data to the display unit 111. The video buffer unit 102 furthermore stores the held video data in the video data storage database 104 in response to a recording request signal supplied from the rule changing unit 108.

The metadata buffer unit 103 holds metadata acquired from the surveillance camera 2 and sequentially supplies the metadata to the display unit 111. The metadata buffer unit 103 furthermore supplies the metadata to the display unit 111 synchronously with the corresponding video data. In addition, the metadata buffer unit 103 stores the metadata acquired from the surveillance camera 2 in the metadata storage database 105.

The filter setting database 107 stores the filter setting based on filtering by the metadata filter unit 106 and also supplies the filter setting to the metadata filter unit 106. In the filter setting, a criterion for determining whether alarm information has to be output or whether the imaging operation of the surveillance camera 2 has to be changed is set for each information item about a surveillance target included in metadata. The metadata is subjected to filtering using the filter setting, so that the result of filtering can be obtained for each information item about the surveillance target. The result of filtering describes the necessity of outputting alarm information or the necessity of changing the imaging operation of the surveillance camera 2.

The metadata filter unit 106 performs filtering on metadata using the filter setting stored in the filter setting database 107 to determine whether to generate an alarm. The metadata filter unit 106 performs filtering on metadata acquired by the metadata buffer unit 103 or metadata supplied from the metadata storage database 105 and notifies the rule changing unit 108 of the result of filtering.

Metadata filters mean criteria for determining whether to generate alarm information on the basis of object information. The alarm information is information subjected to filtering on the basis of the object information expanded from metadata. The alarm information is obtained by analyzing metadata items included in a plurality of frames to derive the velocity of a moving object from a change in the position of the moving object or determine whether the moving object is beyond a certain line, or performing multiple analysis on the metadata items to derive the velocity of the moving object and make such a determination.

As for the kinds of filters, for example, there are seven filters as follows. Any of the filters can be selected.

Appearance: the filter used to determine whether an object exists in a certain area.

Disappearance: the filter used to determine whether the object which has appeared in a certain area is out of the area.

Passing: the filter used to determine whether the object is beyond a certain boundary.

Capacity (limit on the number of objects): the filter used to count the number of objects in a certain area and determine whether the total number of objects exceeds a predetermined value.

Loitering: the filter used to determine whether an object is loitering in a certain area for a time period longer than a predetermined time period.

Unattended: the filter used to determine whether there is an object which has entered a certain area and does not move for a time period longer than a predetermined time period.

Removed: the filter used to detect the removal of an object in a certain area.

The rule changing unit 108 generates a change instruction signal on the basis of the result of filtering notified by the metadata filter unit 106 to notify the surveillance camera 2 of shifting the imaging direction. For example, the rule changing unit 108 outputs an instruction to change the operation of the surveillance camera 2 in order to obtain a surveillance video image suitable for surveillance on the basis of the result of filtering obtained by the metadata filter unit 106. In addition, the rule changing unit 108 supplies a recording request signal to the video data storage database 104 on the basis of the result of filtering and stores video data acquired by the video buffer unit 102 in the video data storage database 104.

The video data storage database 104 stores video data acquired by the video buffer unit 102. The metadata storage database 105 stores metadata acquired by the metadata buffer unit 103.

The video data processing unit 109 performs processing for allowing the display unit 111 to display an image based on video data stored in the video data storage database 104. Specifically, the video data processing unit 109 sequentially reads video data from a reproduction position designated by a user and supplies the read video data to the display unit 111. In addition, the video data processing unit 109 supplies information indicative of the reproduction position (reproduction time) of the video data which is being reproduced to the reproduction synchronizing unit 112.

The reproduction synchronizing unit 112 synchronizes the reproduction of metadata with that of video data. The reproduction synchronizing unit 112 supplies a synchronization control signal to the metadata processing unit 110 so that the reproduction position supplied from the video data processing unit 109 is synchronized with a reproduction position of the corresponding metadata stored in the metadata storage database 105, thus controlling the operation of the metadata processing unit 110.

The metadata processing unit 110 performs processing for allowing the display unit 111 to display metadata stored in the metadata storage database 105. Specifically, the metadata processing unit 110 sequentially reads metadata from a reproduction position designated by the user and supplies the read metadata to the display unit 111. To reproduce both of video data and metadata, the metadata processing unit 110 controls the reproducing operation on the basis of the synchronization control signal supplied from the reproduction synchronizing unit 112 and outputs metadata synchronized with video data to the display unit 111.

The display unit 111 displays live video data supplied from the video buffer unit 102, reproduced video data supplied from the video data processing unit 109, live metadata supplied from the metadata buffer unit 103, and reproduced metadata supplied from the metadata processing unit 110. In addition, the display unit 111 displays (outputs) a video image showing the result of surveillance based on the result of filtering in accordance with filter setting supplied from the metadata filter unit 106 using any of a video image to be monitored, a video image of metadata, and a video image of the filter setting, or a video image obtained by combining these video images.

The display unit 111 also functions as a graphical user interface (GUI). The user can select a camera setting menu displayed on the display unit 111 using an operation key, a mouse, or a remote control to register and set a new camera and can select a filter setting menu to define a filter.

A process for registering and setting a new camera in the above-described surveillance system will now be described. In the present embodiment, a function for replying to an inquiry about specification information is provided for an imaging device. In addition, a general-purpose network camera interface in which the command protocol between the imaging device and an information processing apparatus is standardized is used.

Figure 4:
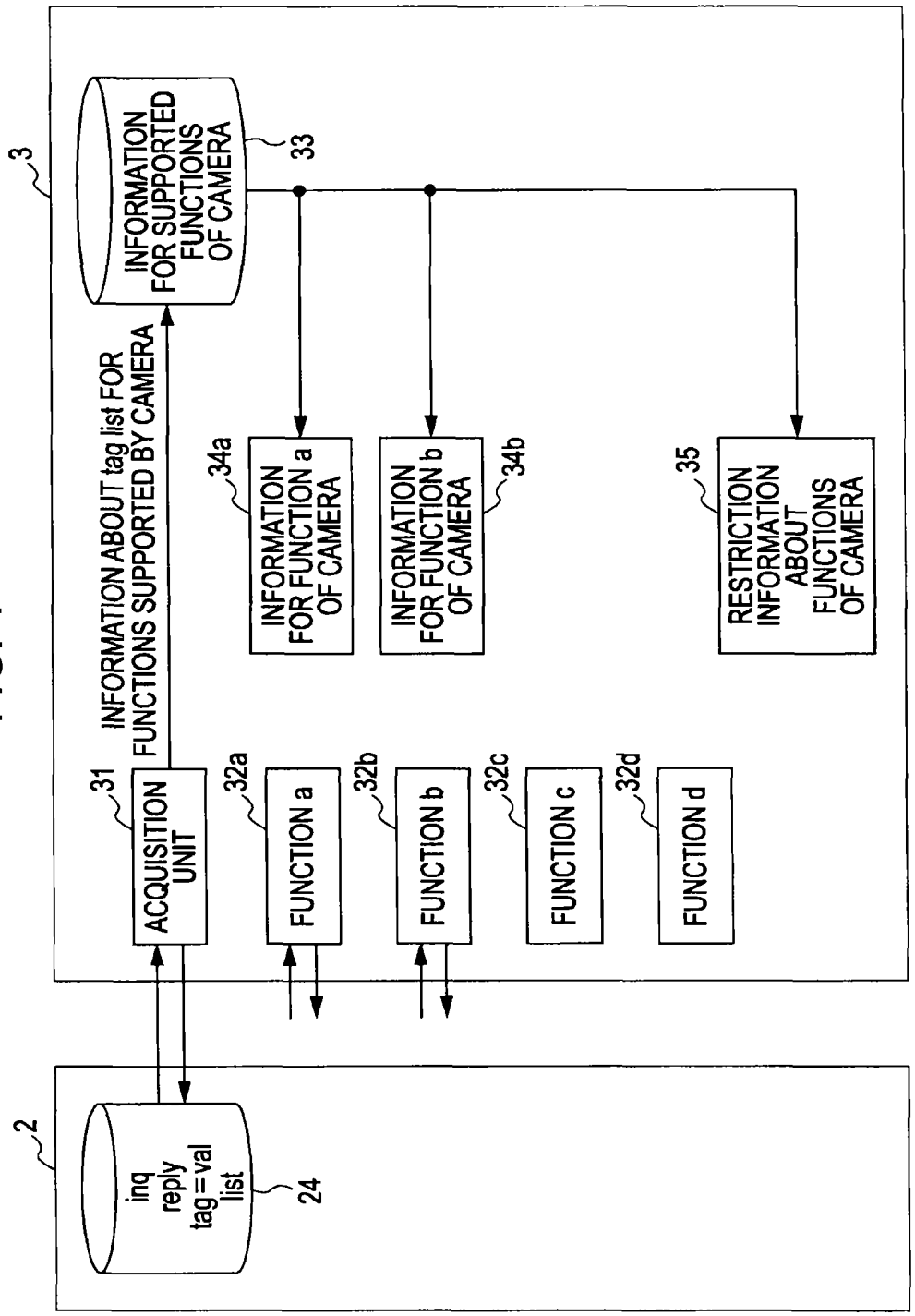
FIG. 4 is a diagram explaining a method of registering and setting a camera in the surveillance camera system.

FIG. 4 is a diagram explaining a method of registering and setting a camera in the surveillance system. The surveillance camera 2 stores specification information (inq reply tag=val list) in a system storage unit 24, such as an erasable programmable read only memory (EPROM) or a flash memory, the specification information including information about a list of functions and restriction information about restrictions on the functions. The recorder 3 includes an acquisition unit 31 that acquires the specification information from the surveillance camera 2, a plurality of functions (functions a to d) 32a to 32d related to a codec, an image size, and so forth, and a storage unit 33 that stores a table describing information about general functions (list of functions) of the surveillance camera 2. In this case, the acquisition unit 31 corresponds to the network connecting unit 101 and the functions a 32a to functions d 32d correspond to the codec function and other functions in the video data processing unit 109, respectively.

As for description of the specification information, it is preferable to easily exchange information through the network 1 using a markup language defined in order to describe information exchanged over the World Wide Web (WWW). For example, video data and metadata can be easily exchanged using Extensible Markup Language (XML) used for exchange of documents and electronic data.

To register the surveillance camera 2 connected to the network 1, the recorder 3 acquires specification information, including the following items, from the surveillance camera 2 using a CGI command.

Model name of the camera and icon data
List of functions supported by the camera
List of parameters necessary for setting the functions and set ranges for the parameters
Restrictions on the individual functions The information item about the list of the functions supported by the camera includes, for example, a moving-image codec, a still-image codec, a moving-image resolution, and a still-image resolution. The information item about the restrictions on the individual functions describes that, for example, when a certain function is used, the load on a central processing unit (CPU) of the camera increases, so that another function is not available. More specifically, this information describes that, for instance, when a certain function is used, the performance (range of set values) of the camera is restricted such that the upper limit is lowered, and when another certain function is used, the performance of another function is restricted such that the upper limit is lowered.

The recorder 3 associates each supported function included in the information about the general functions of the surveillance camera 2 with a range of set values to dynamically construct setting information unique to the model of the surveillance camera 2. For example, the recorder 3 acquires the information about the list of the functions supported by the camera, so that the recorder 3 recognizes that the surveillance camera 2 supports the functions a and b with reference to information blocks 34a and 34b in FIG. 4. In addition, as will be described later, the recorder 3 acquires a list of the restrictions on the functions to dynamically construct functional restriction information 35, thus controlling the display of a camera setting window.

Table 1 describes an example of function list information about a list of functions of a camera.

TABLE 1 varModel="SNC-XXXXX"
var GenericCameraVersion="1.00"
var Bitmap="true"
var NonVolatilizationLog="true"
var NTP="true"
var TimeZone="true"
var FTPClient="true"
var SMTP="true"
var SolidPTZ="true"
var ExclusivePanTiltZoomFocus="true"
var HoldAutoIrisOpen="true"
var ImageMemoryList="builtin"
var SensorInNumber="1"
var SensorInModeList="Make,Break"
var AlarmOutNumber="2"
var AlarmDurationRange="0,300,1"
var ImageCodecList="jpeg,jpeg-mpeg4,h264"
var AlmBufCodecList="jpeg,jpeg-mpeg4,h264"
var ArcCodecList="mpeg4"
var AreaSelectList="jpeg,1280"
var AreaSelectRange="1,1280,1,960"
var AreaSelectAlignment="1,1,16,16"
var JpImageSizeList="1280,960,960,720,768,576,640,480,384,288,320,240"
var JpQualityRange="1,10,1"
var JpTargetRatioRange="5,60,1"
var JpFrameRateList="1,2,3,4,5,6,8,10,15,20,25,30"
var M4ImageSizeList="640,480,384,288,320,240"
var M4BitrateRange="64,20,48,1"
var M4IFrameIntervalRange="1,900,1"
var M4FrameRateList="5,6,8,10,15,20,25,30"
var AudioInCodecList="g711,g726_40,g726_32,g726_24,g726_16"
var AudioInVolumeRange="-10,10,1"
var AudioOutCodecList="g711,g726_40,g726_32,g726_24,g726_16"
var AudioOutVolumeRange="-10,10,1"
.
.
.
var SoftwareVersion="1.00"
var Revision="1"

This function list information describes the model name of the camera, information about pan/tilt/zoom, information about a supported image codec, and information about a supported audio codec.

Table 2 and Table 3 describe examples of function restriction information.

TABLE 2

```
<?xmlversion="1.0" encoding="UTF-8" ?>
  <categories revision="1">
    - <category name="codec">
      - <groups>
        - <group>
          - <paramsets>
            - <parameter name="ImageCodec">
              ImageCodec
              <value name="jpeg-mpeg4" type="item">jpeg-mpeg4</value>
              <value name="jpeg" type="item">jpeg</value>
            /parameter>
            - <parameter name="JpImageSize">
              JpImageSize
              <value name="1280,0" type="item">1280×960</value>
              <value name="960,0" type="item">960×720</value>
              <value name="768,0" type="item">768×576</value>
              <value name="640,0" type="item">640×480</value>
              <value name="384,0" type="item">384×288</value>
              <value name="320,0" type="item">320×240</value>
            </parameter>
            - <parameter name="M4ImageSize">
              M4ImageSize
              <value name="640,0" type="item">640×480</value>
              <value name="384,0" type="item">384×288</value>
              <value name="320,0" type="item">320×240</value>
              <value type="item">-</value>
            <parameter>
            - <parameter name="SolidPTZ">
              SolidPTZ
              <value name="off" type="item">off</value>
              <value name="on" type="item">mpeg4</value>
              <value name="on" type="item">jpeg</value>
              <value name="on" type="item">jpeg-mpeg4</value>
            </parameter>
            - <paramater name="PrivacyDispEach">
              PrivacyMasking
              <value name="1,off,2,off,3,off,4,off,5,off,6,off,7,off" type="item">off</value>
              <value type="item">mpeg4</value>
              <value type="item">jpeg</value>
              <value type="item">jpeg-mpeg4</value>
            </parameter>
            - <parameter name="LightFunnelMode">
              Light Funnel Mode
              <value name="manual" type="item">manual</value>
              <value name="auto" type="item">auto</value>
            </parameter>
            - <parameter name="LightFunnel">
              Light Funnel
              <value name="off" type="item">off</value>
              <value name="on" type="item">on</value>
              <value type="item">-</value>
            </parameter>
          </paramsets>
```

TABLE 3

```
- <sets>
  - <set>
      <item JpImageSize value="1280×960" />
      <item SolidPTZ value="off" />
      <item ImageCodec value="jpeg-mpeg4" />
      <item PrivacyMasking value="off" />
      <item M4ImageSize value="640×480" />
      <item Light Funnel value="off" />
      <item Light Funnel Mode value="manual" />
    </set>
  - <set>
      <item JpImageSize value="640×480" />
      <item SolidPTZ value="off" />
      <item ImageCodec value="jpeg-mpeg4" />
      <item PrivacyMasking value="off" />
      <item M4ImageSize value="640×480" />
      <item Light Funnel value="off" />
      <item Light Funnel Mode value="manual" />
    </set>
  - <set>
```

TABLE 3-continued

```
      <item JpImageSize value="384×288" />
      <item SolidPTZ value="off" />
      <item ImageCodec value="jpeg-mpeg4" />
      <item PrivacyMasking value="off" />
      <item M4ImagdSize value="640×480" />
      <item Light Funnel value="off" />
      <item Light Funnel Mode value="manual" />
    </set>
  - <set>
      <item JpImageSize value="960×720" />
      < tem SolidPTZ value="off" />
      <item ImageCodec value="jpeg" />
      <item PrivacyMasking value="off" />
      <item M4ImageSize value="-" />
      <item Light Funnel value="off" />
      <item Light Funnel Mode value="manual" />
    </set>
    .
    .
    .
  - <set>
```

TABLE 3-continued

```
<item JpImageSize value="320×240" />
        <item SolidPTZ value="off" />
        <item ImageCodec value="jpeg-mpeg4" />
        <item PrivacyMasking value="jpeg-mpeg4" />
        <item M4ImageSize value="320×240" />
        <item Light Funnel value="-"/>
        <item Light Funnel Mode value="auto" />
    </set>
    </sets>
    </group>
    </group>
    </groups>
    </category>
</categories>
```

This function restriction information includes a plurality of set information items each describing settable functions in the camera and the combination of parameters. For example, all settable combinations of resolutions and codecs are described in this information. Accordingly, in setting a new camera as will be described below, a combination of settable parameters can be presented to the user. In addition, the color of characters of a selectable parameter in the list can be displayed so as to be different from that of characters of an unselectable parameter.

A concrete example where the surveillance camera 2 is registered and set in the recorder 3 will now be described with reference to window examples.

Figure 5:
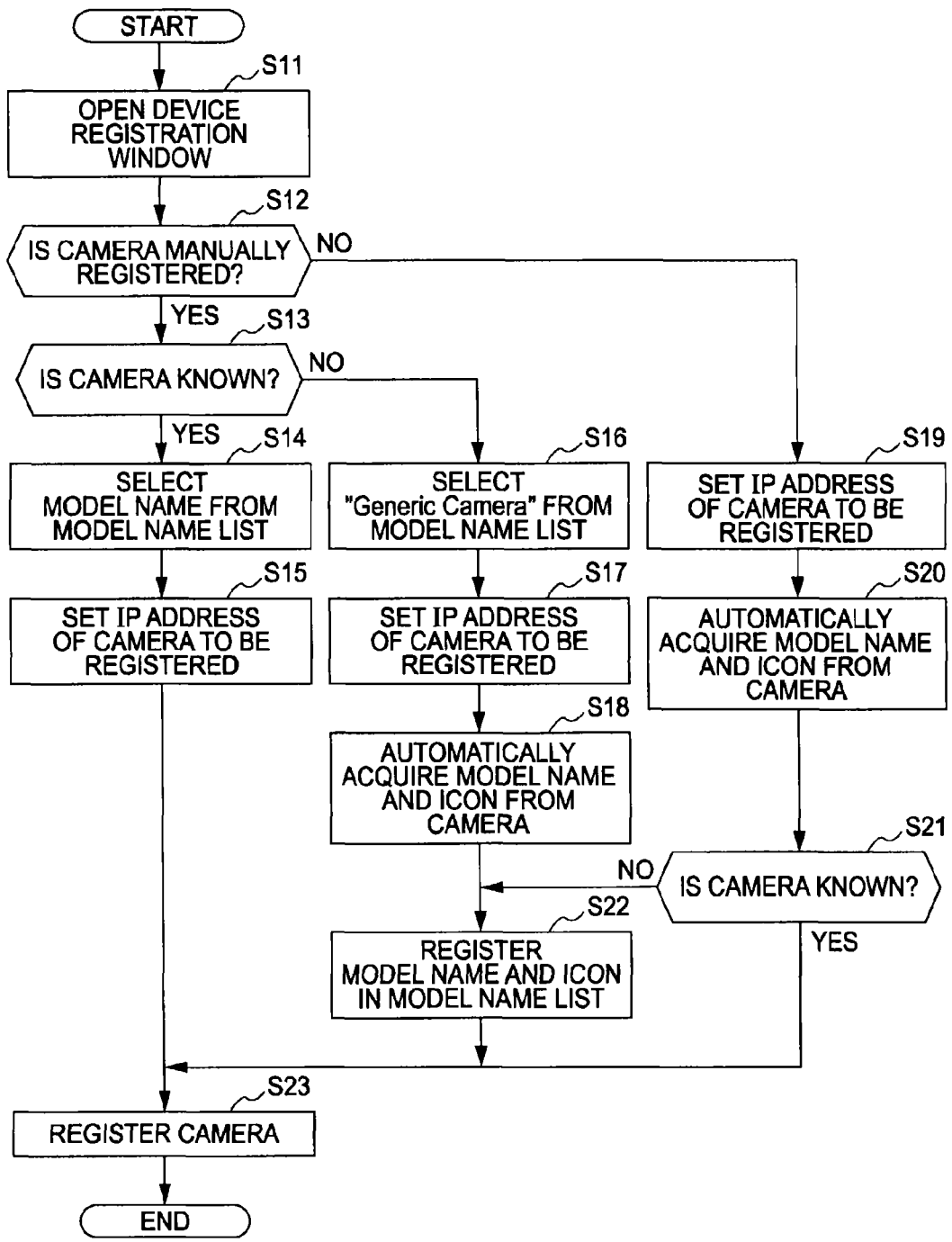
FIG. 5 is a flowchart illustrating an exemplary process for registering a camera.
Figure 6:
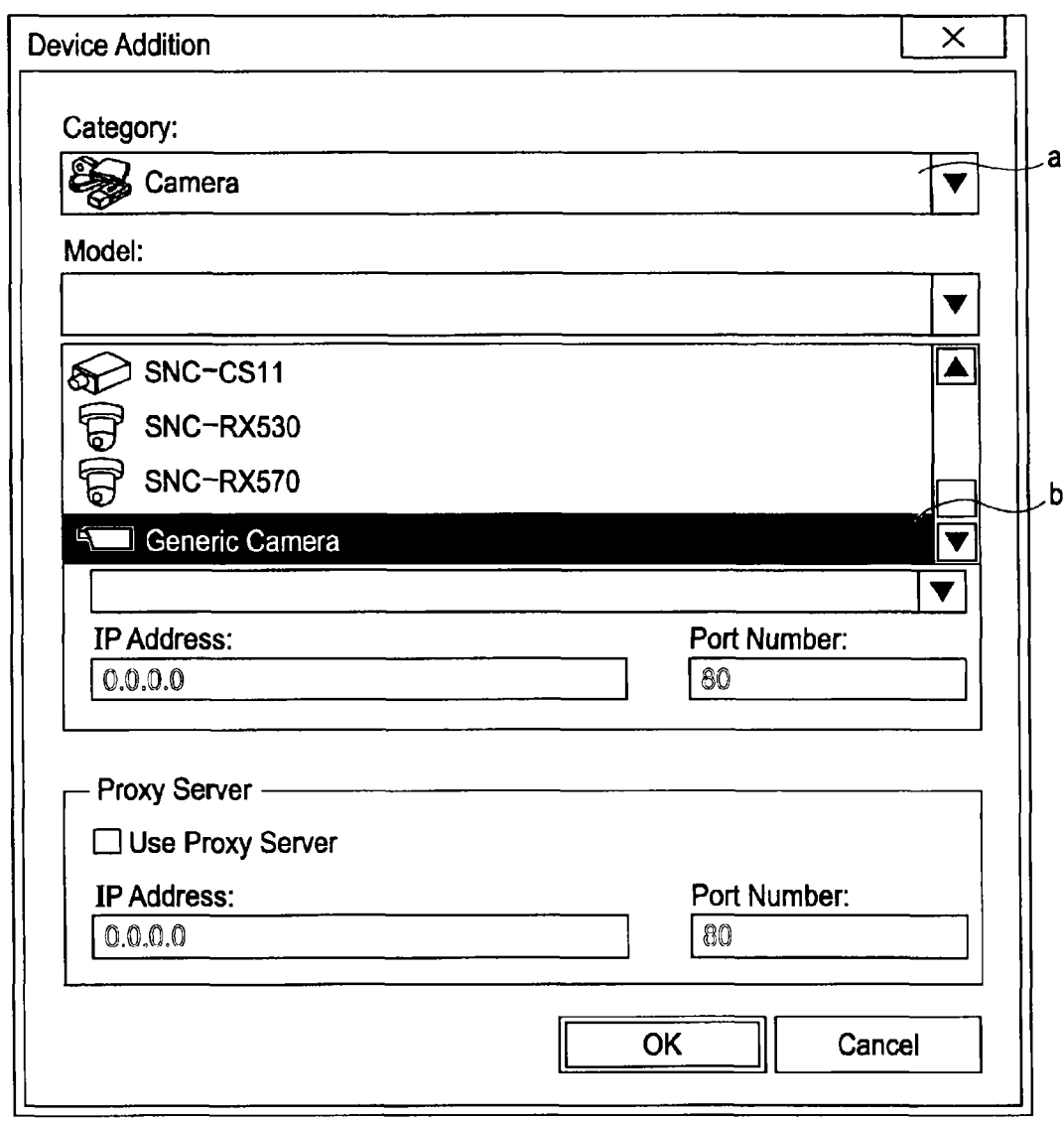
FIG. 6 illustrates an example of a registration window.

FIG. 5 is a flowchart illustrating an exemplary process for registering a camera. In step S11, the recorder 3 displays a device registration window, as shown in FIG. 6, for adding a device.

In step S12, the recorder 3 determines whether the registration is manually performed. For example, whether the registration is manually performed can be determined on the basis of whether "automatic setting" is selected in a field, indicated by "a", describing a list of device categories in the registration window of FIG. 6 or whether "camera" is selected in this field. In the case of the manual registration, the process proceeds to step S13. In the case of the automatic registration, the process proceeds to step S19.

In step S13, the recorder 3 determines whether the camera to be registered is a known camera. For example, whether the target camera is known can be determined on the basis of whether "Generic Camera" is selected in a field, indicated by "b", describing a list of model names in the registration window of FIG. 6. When a model name is selected from the list (step S14), the recorder 3 recognizes that the known camera is to be registered. When "Generic Camera" is selected in the list (step S16), the recorder 3 recognizes that an unknown camera is to be registered.

Figure 7:
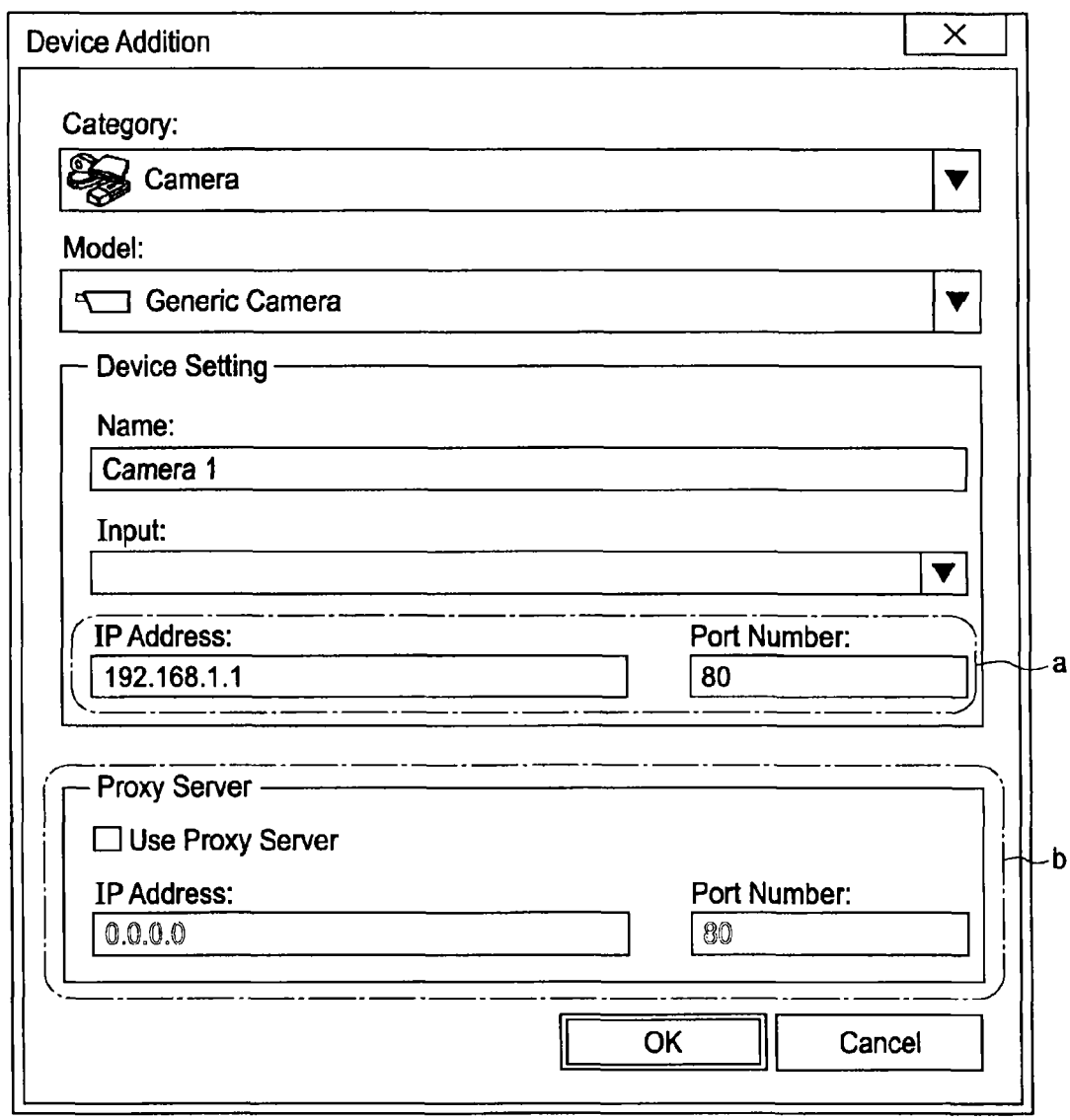
FIG. 7 illustrates another example of the registration window.

In step S15, the recorder 3 establishes connection with the registration target camera through the network 1 on the basis of setting in an IP address input field, indicated by "a", in an exemplary registration window shown in FIG. 7. When the connection between the recorder 3 and the registration target camera is established, the process proceeds to step S23. In step S23, the model name of the camera is stored, so that the camera is registered. A proxy server set in a proxy server field, indicated by "b" in FIG. 7, may be used as necessary.

In step S17, the recorder 3 establishes connection with the unknown registration target camera through the network 1 on the basis of, for example, setting in the IP address input field, indicated by "a" in FIG. 7, in the exemplary registration window in the same way as step S15.

In step S18, the recorder 3 acquires specification information, including the model name and icon data, from the unknown camera using a network camera interface command protocol. The acquired specification information, including the model name and the icon data, is stored in the storage unit 33 and the model name is registered in the drop-down list in the model name list field (step S22).

For example, when "automatic setting" is selected in the category list field indicated by "a" in FIG. 6, the recorder 3 establishes connection with the unknown registration target camera via the network 1 in step S19 on the basis of setting in the IP address input field indicated by "a" in the registration window of FIG. 7 in the same way as step S15.

In step S20, the recorder 3 acquires specification information, including the model name and icon data, from the unknown camera using the network camera interface command protocol.

In step S21, the recorder 3 determines whether the camera model name acquired in step S20 has been registered in the storage unit 33. When the camera model name has been registered, the process proceeds to step S23. When the model name is not registered, the process proceeds to step S22.

In step S22, the recorder 3 stores the acquired specification information, including the model name and the icon data, in the storage unit 33 and registers the model name and the icon in the drop-down list in the model name list field.

In step S23, the recorder 3 registers the camera with the known model name or the camera with the model name acquired from the specification information. The process then terminates.

As described above, the specification information acquired using the network camera interface command protocol is linked to the model name of the camera. If specification information about a camera has been acquired once, therefore, the camera is known. In other words, it is unnecessary to acquire information using the network camera interface the next time. When the camera model name is acquired, information unique to the model of the camera constructed in the recorder can be used. When the camera is known, the model name is also displayed in the model name list upon camera registration. Consequently, when the model name is selected from the list, the camera can be registered. Advantageously, a user operation can be simplified.

A process for setting the functions of the surveillance camera 2 on the side of the recorder 3 will now be described with reference to window examples. The setting process is performed on the surveillance camera 2 registered in the recorder 3 on the basis of, for example, the network camera interface.

Figure 8:
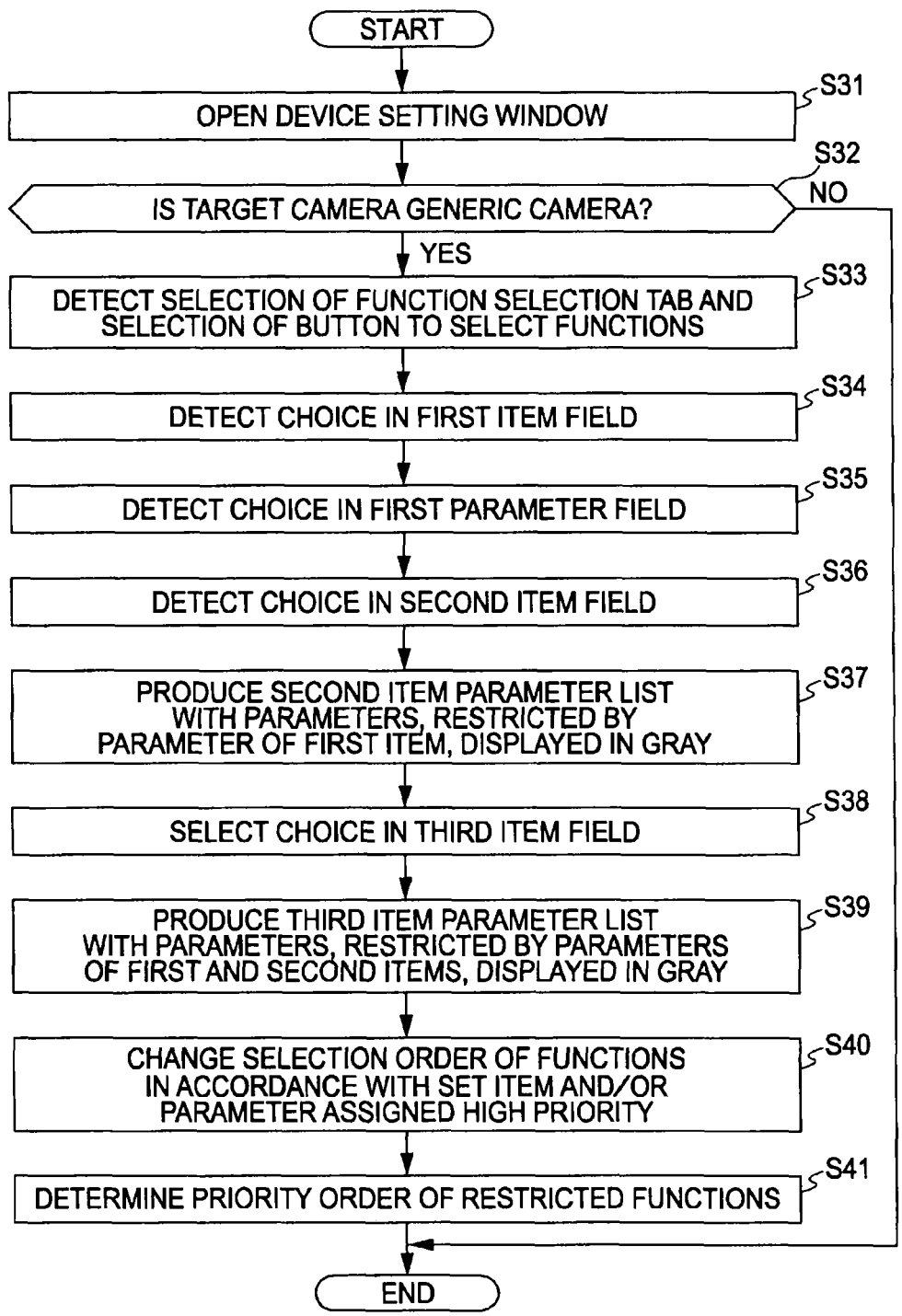
FIG. 8 is a flowchart illustrating an exemplary process for setting camera functions.
Figure 9:
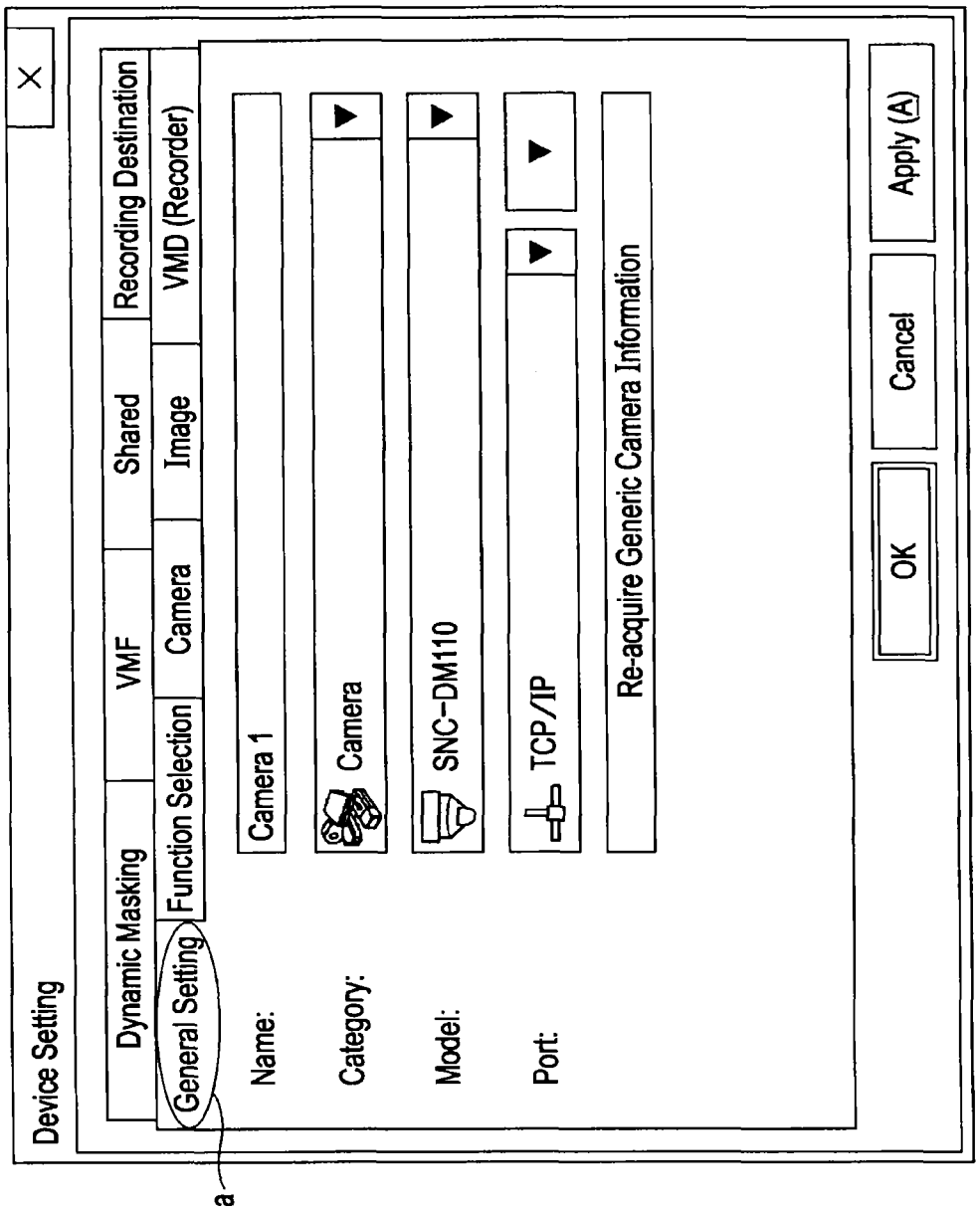
FIG. 9 illustrates an example of a camera setting window.

FIG. 8 is a flowchart illustrating an exemplary process for setting camera functions. In step S31, the recorder 3 displays a camera setting window shown in, for example, FIG. 9. In this example, the name, device type, model name, and icon of a registered camera are shown in a tab, indicated by "a", for general setting. In this GUI, a button for "Re-acquire Generic Camera Information" is disposed. Accordingly, when information is updated on the camera side because the firmware of the camera is updated, the specification information of the camera can be automatically re-acquired and updated. In addition, since the specification information can be updated manually instead of automatically, it is possible to address a problem in that automatic update affects descriptions about the setting of the registered camera.

In step S32, the recorder 3 determines whether a target camera to be set has been registered by the registration process. When the camera is known, the setting process terminates because the setting process has already been performed. When the camera has been registered by the registration process, the process proceeds to step S33.

Figure 10:
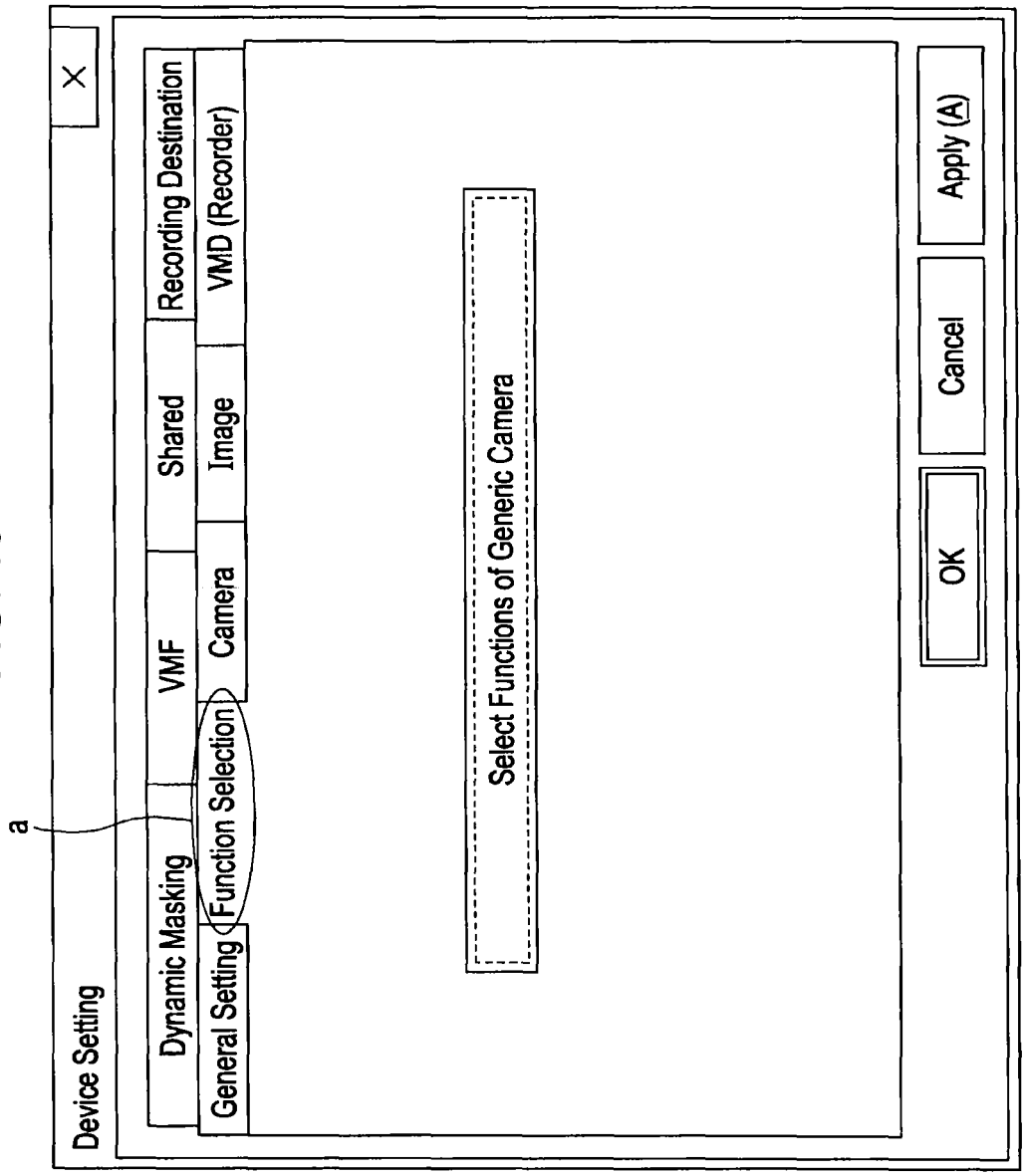
FIG. 10 illustrates another example of the camera setting window.

In step S33, the recorder 3 displays a camera setting window shown in, for example, FIG. 10. When a button to select functions in a function selection tab, indicated by "a" in FIG. 10, in the camera setting window is selected, the recorder 3 displays a function selection window shown in, for example, FIG. 11. This function selection window is designed such that a function assigned the highest priority is to be selected in the top "item" field. More specifically, items "JPEG Image Size", "Video Codec", and "MPEG4 Image Size" are arranged in order of priority from the top. The arrangement is not limited to this case. A function assigned the highest priority may be to be selected in any "item" field.

Figure 11:
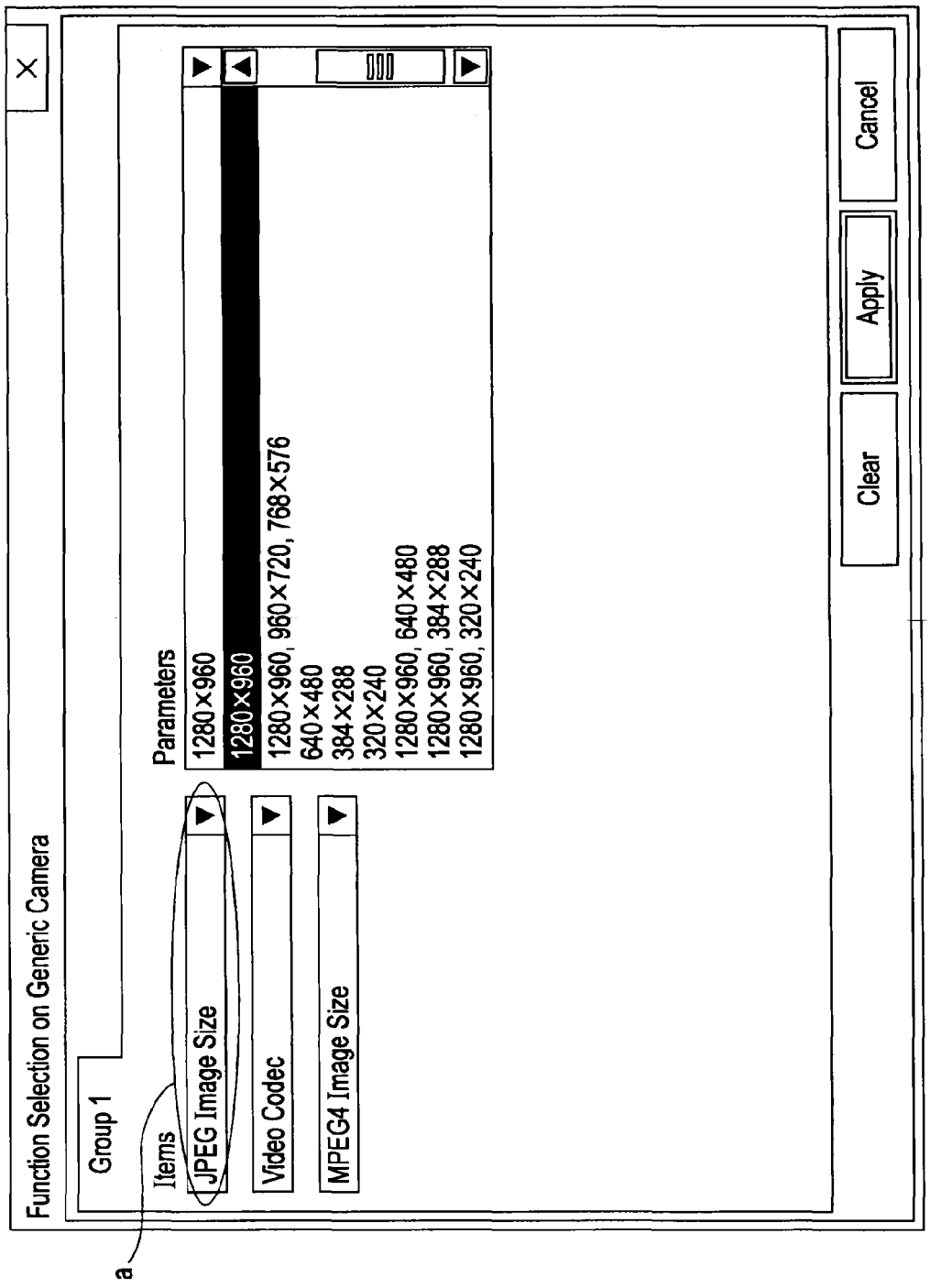
FIG. 11 illustrates an example of a camera function selection window.

In step S34, the recorder 3 detects a choice in the first function item field indicated by "a" in FIG. 11. In the function selection window of FIG. 11, the first item is "JPEG Image Size".

In step S35, the recorder 3 displays a list of parameters in a first parameter field on the basis of the above-described restriction information. The recorder 3 detects a choice in the first parameter field. In the function selection window of FIG. 11, "1280×960" is selected.

In step S36, the recorder 3 detects a choice in the second function item field. In the function selection window of FIG. 11, the second item is "Video Codec".

Figure 12:
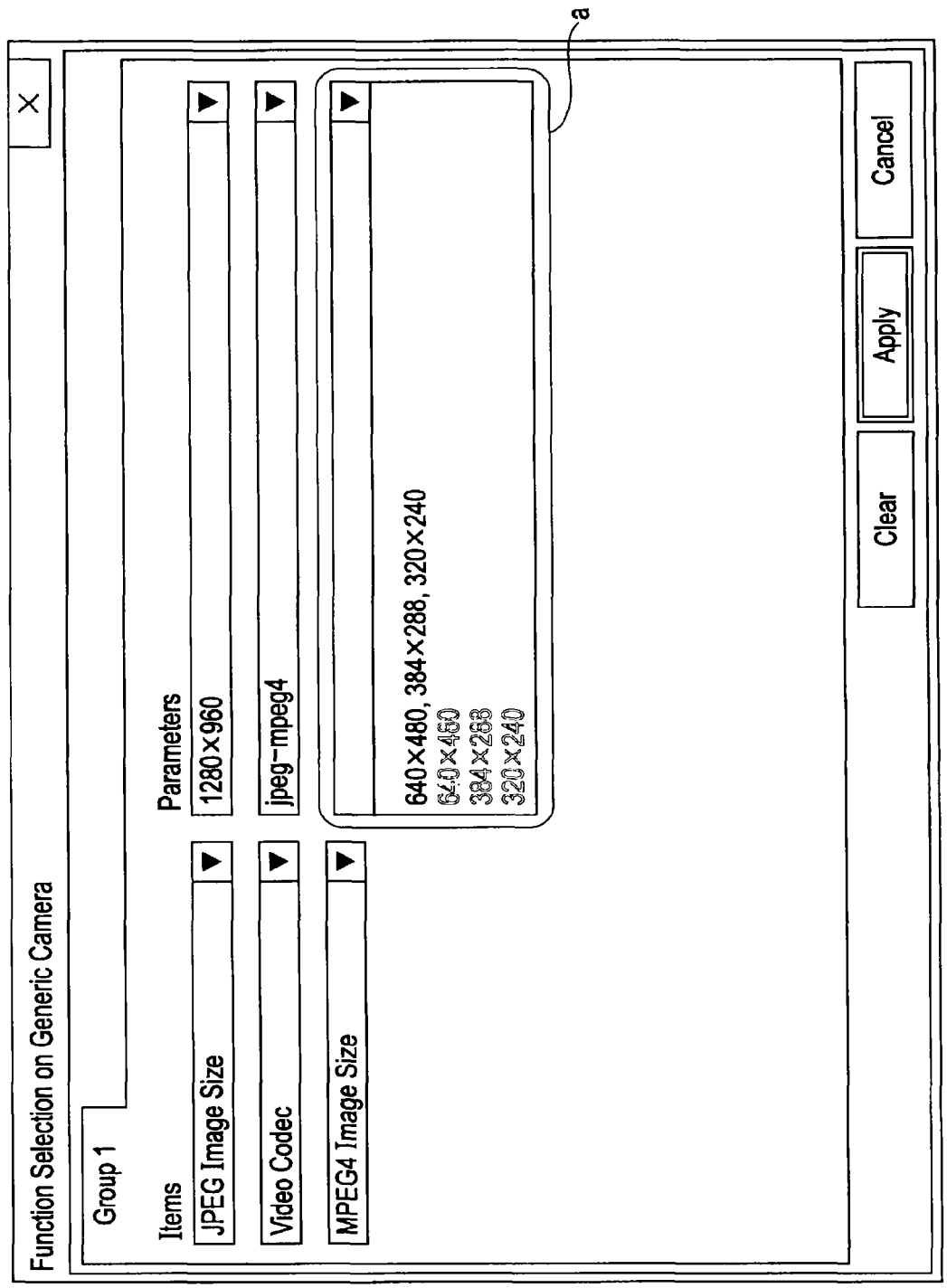
FIG. 12 illustrates another example of the camera function selection window.

In step S37, the recorder 3 displays a list of parameters in a second parameter field on the basis of the restriction information about the camera. In this case, the recorder 3 displays a drop-down list in the second parameter field such that the characters of parameters restricted by the first function parameter are displayed in gray indicating "unselectable" mode. The recorder 3 detects a choice in the second parameter field. In an example of the function selection window shown in FIG. 12, "jpeg-mpeg4" is selected.

In step S38, the recorder 3 detects a choice in the third item field. In the function selection window in FIG. 12, the third item is "MPEG4 Image Size".

In step S39, the recorder 3 displays a list of parameters in a third parameter field on the basis of the camera restriction information. The recorder 3 displays a drop-down list in the third parameter field such that the characters of parameters restricted by the first and second function parameters are displayed in gray indicating the "unselectable" mode. The recorder 3 detects a choice in the third parameter field, indicated by "a" in FIG. 12, relating to the third function. In the function selection window shown in FIG. 12, only one choice describing "640×480, 384×288, 320×240" is selectable.

Figure 13:
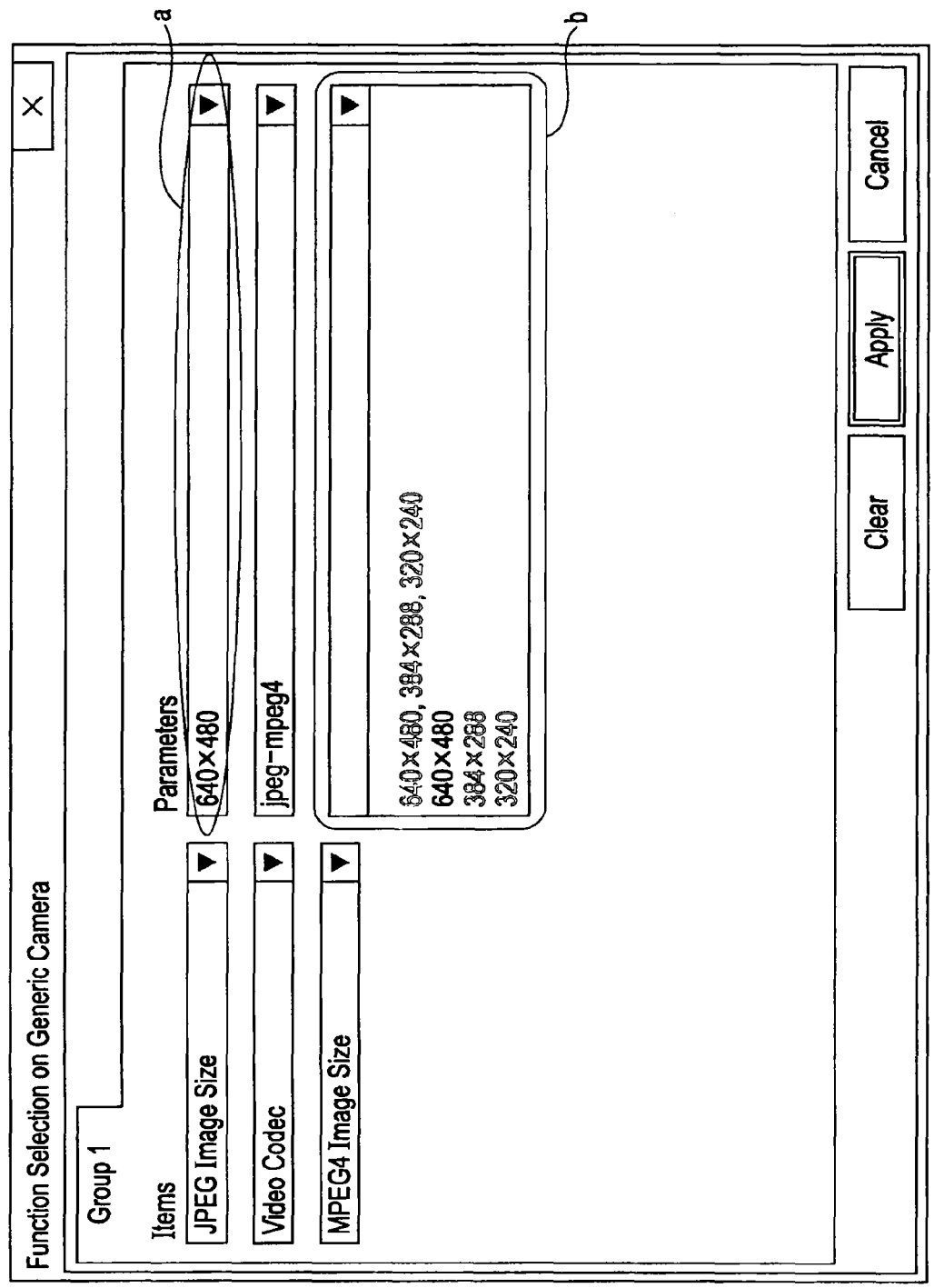
FIG. 13 illustrates another example of the camera function selection window.

In step S40, the recorder 3 changes the selection order of the functions in accordance with a change in any function item field and/or any parameter field, the change being performed by the user. For instance, in an example of the function selection window shown in FIG. 13, the parameter in the parameter field, indicated by "a", relating to "JPEG Image Size" is changed to "640×480", so that "640×480" is changed to be selectable in the drop-down list in the parameter field, indicated by "b", relating to "MPEG4 Image Size". In an example of the function selection window shown in FIG. 14, the function item in the first item field, indicated by "a", is changed to "MPEG4 Image Size" and the parameter in the corresponding parameter field is changed to "640×480, 384×288, 320×240", so that "1280× 960" is changed to be selectable in the list in the third parameter field, indicated by "b", relating to "JPEG Image Size". The restriction information describing all of the settable combinations of, for example, resolutions and codecs is referred to as described above, so that remaining choices can be easily narrowed on the basis of parameters and the selection order of items. Thus, the next selectable item or value can be easily changed.

Figure 14:
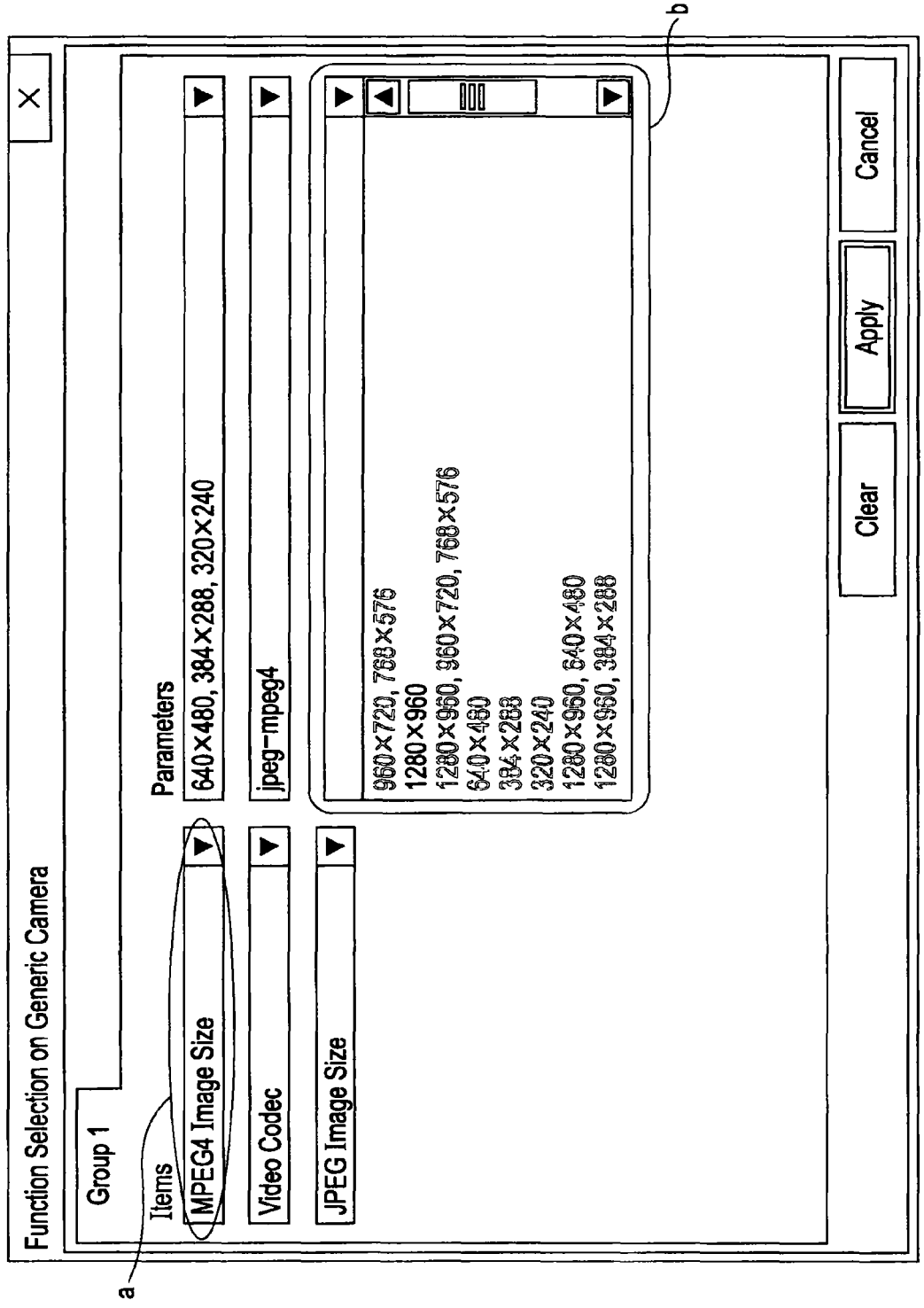
FIG. 14 illustrates another example of the camera function selection window.

In step S41, the recorder 3 detects the determination of the function selection in accordance with, for example, the selection of the "Apply" button shown in, for example, FIG. 14. The process for setting the camera functions then terminates.

Figure 15:
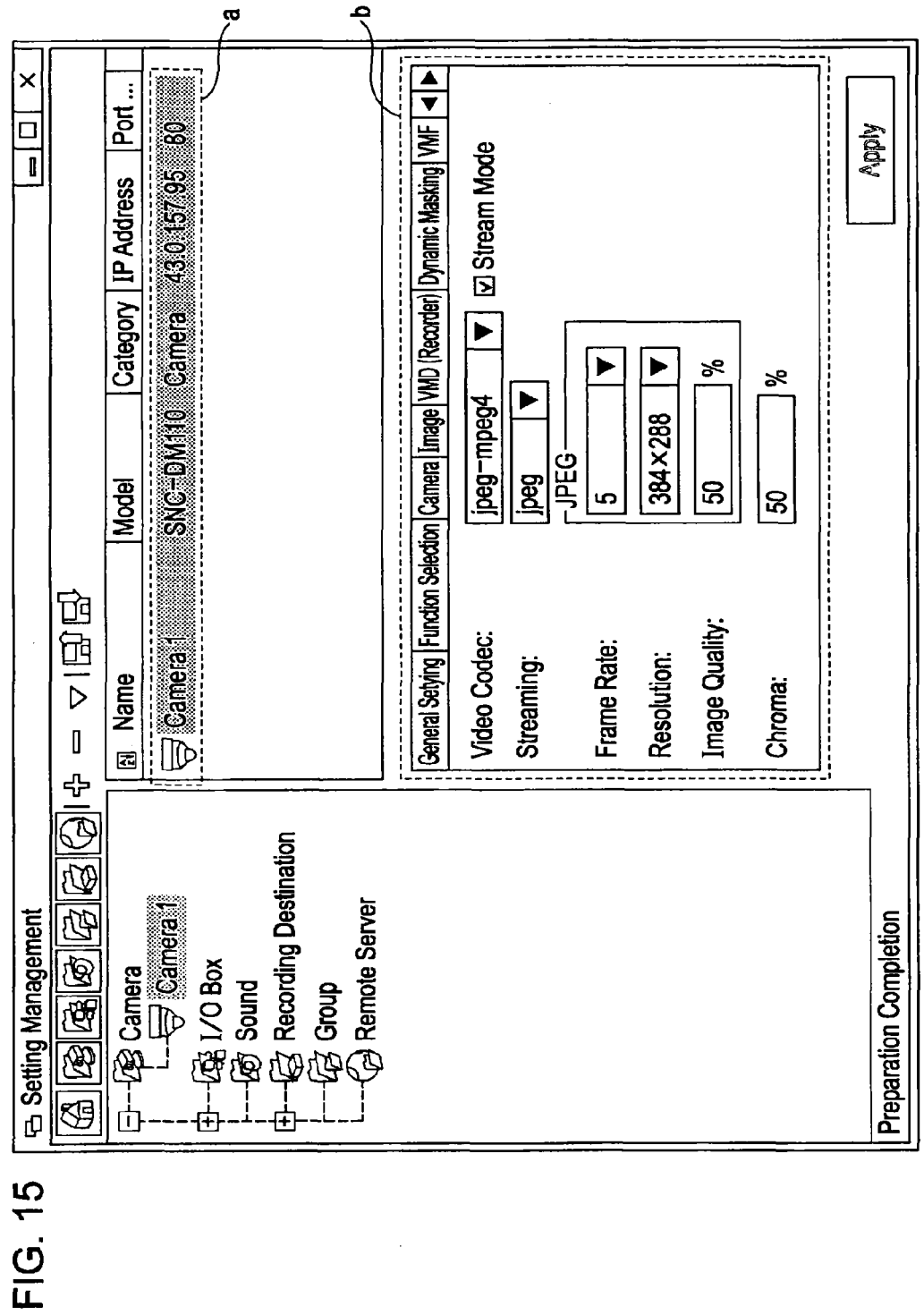
FIG. 15 illustrates an example of a device setting management window.

Consequently, the recorder 3 can display a setting management window as shown in, for example, FIG. 15. In this example of the setting management window, the icon, name, type (model name), category, IP address, and other items of a camera registered using the network camera interface are displayed in an area indicated by "a" in FIG. 15. Specifically, the icon and model name of the camera are correctly read. In an image tab in an area, indicated by "b", set values in the ranges of the respective parameters set in the function selection window are displayed. A set value can be changed in each set parameter range.

As described above, when the surveillance camera 2 is newly registered in the recorder 3, the restriction information describing all of the settable combinations of functions, for example, resolutions and codecs is acquired. Thus, the functions supported by the camera are displayed in the setting window displayed in the recorder 3 so that the user can select the functions. In addition, settable parameters are selectably displayed in each drop-down list, so that a user operation can be simplified. Specifically, the recorder 3 sequentially narrows remaining choices in accordance with the selected combination of functions. Thus, the user can easily obtain the combinations of functions suitable for user's intended use by selecting functions which the user wants to use in order of priority.

In this embodiment, the recorder 3 monitoring the surveillance cameras 2 is used. A computer in which application software for monitoring the surveillance cameras 2 is installed may be used.

Figure 16:
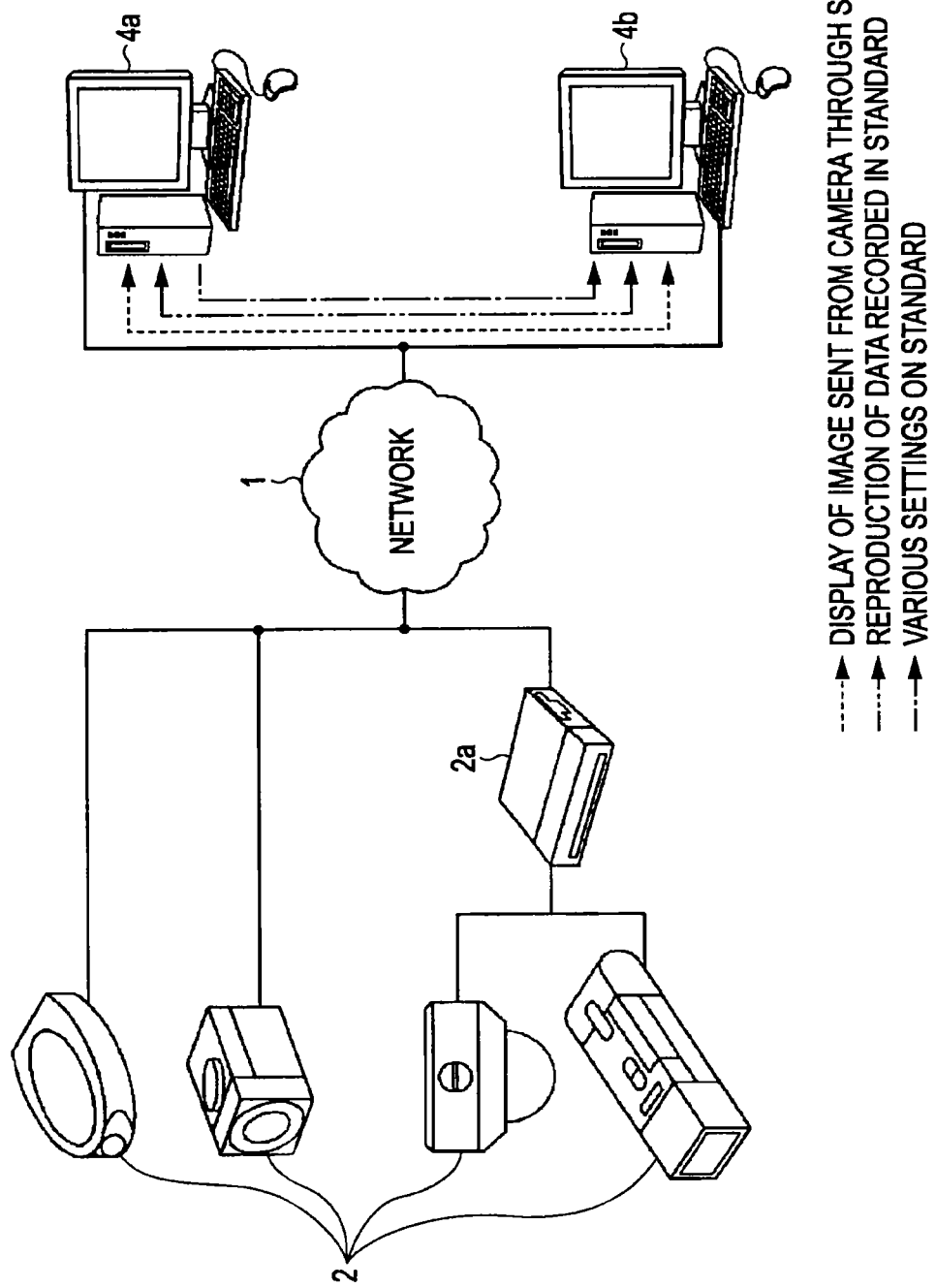
FIG. 16 is a diagram illustrating an exemplary structure of a surveillance camera system according to another embodiment of the invention.

FIG. 16 is a diagram illustrating an exemplary structure of a surveillance camera system according to another embodiment of the present invention. The same components as those in the surveillance camera system shown in FIG. 1 are designated by the same reference numerals and description of these components is omitted. The surveillance camera system includes a plurality of surveillance cameras 2 and a plurality of computers 4a and 4b. The surveillance cameras 2 are connected directly or through a video network station 2a to a network 1. On the computer 4a as a controller, application software for remote-controlling similar operations as those of the above-described recorder through the network 1 is installed. On the computer 4b as a standard, application software for monitoring, recording, and playing video images and sounds captured by the surveillance cameras 2 through the network 1 is installed.

Figure 17:
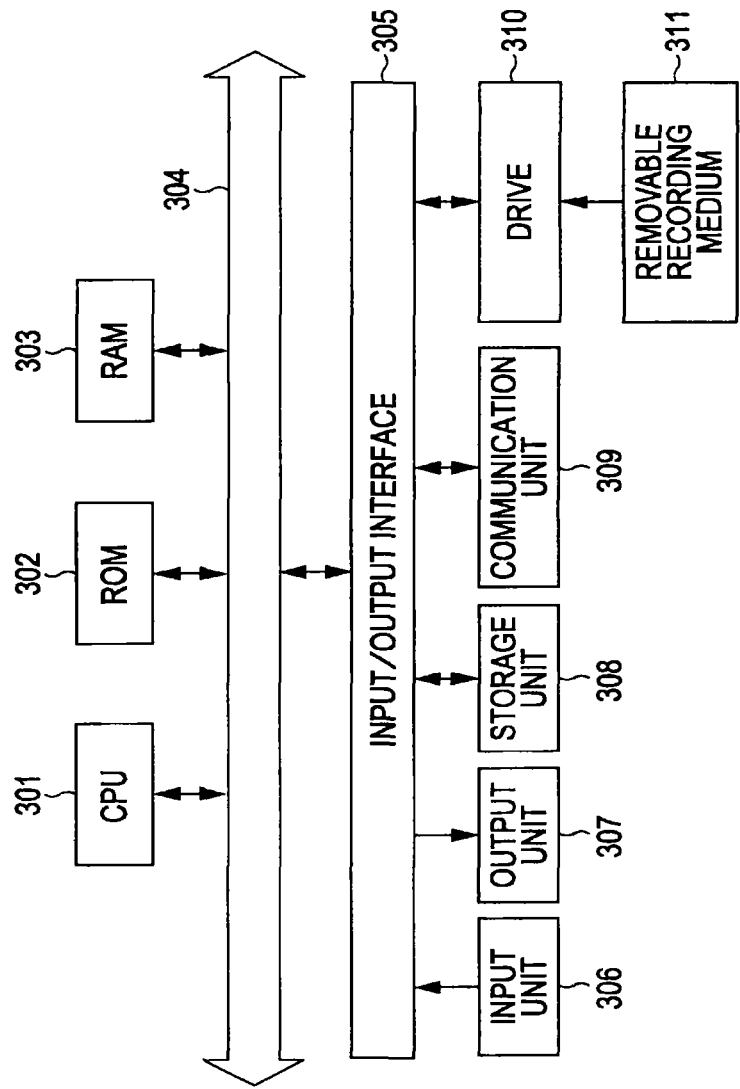
FIG. 17 is a block diagram illustrating the configuration of a computer.
Figure 18:
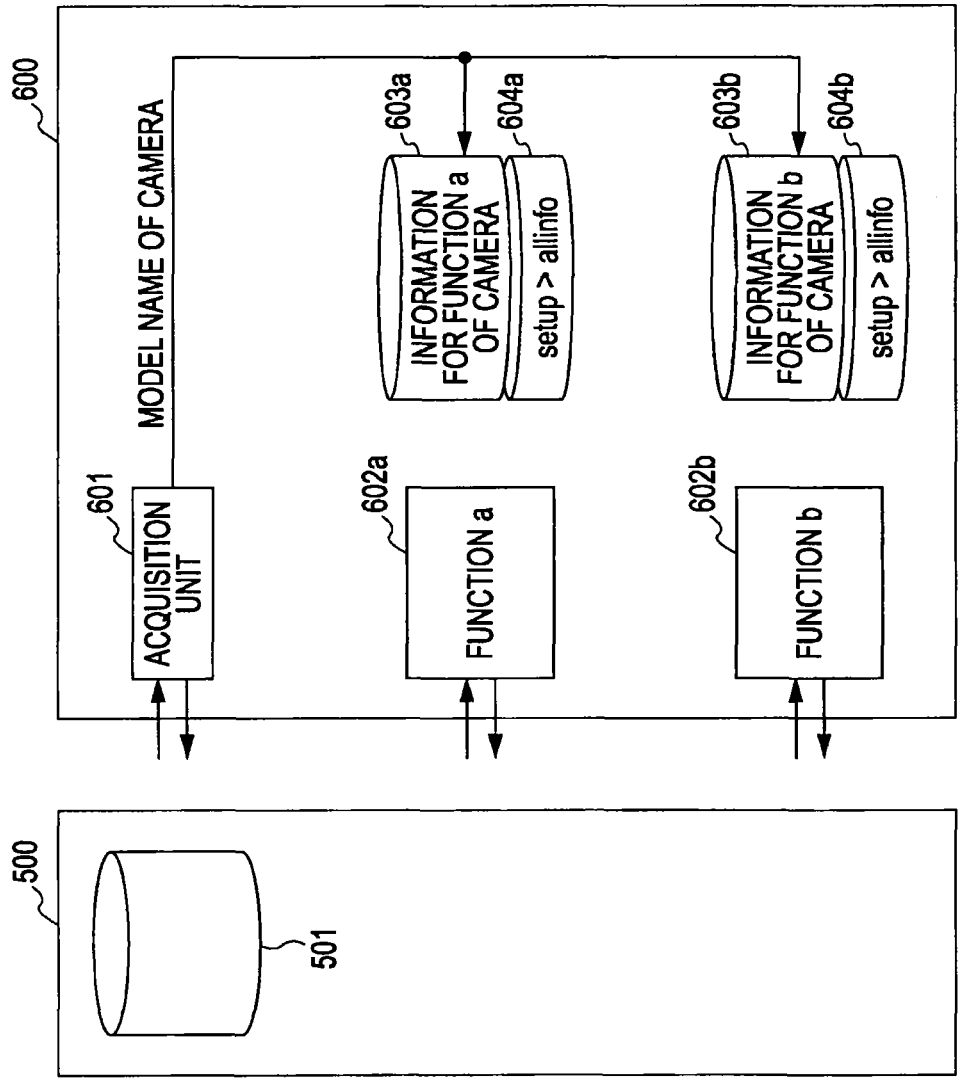
FIG. 18 is a diagram explaining a method of registering and setting a camera in a related-art camera system.

FIG. 17 is a block diagram illustrating the configuration of each computer. A central processing unit (CPU) 301 implements various processes in accordance with a program recorded on a read only memory (ROM) 302 or a program loaded from a storage unit 308 into a random access memory (RAM) 303. The RAM 303 stores data necessary for the implementation of various processes by the CPU 301 as appropriate.

The CPU 301, the ROM 302, and the RAM 303 are connected to the bus 304. The bus 304 is also connected to an input/output interface 305.

The input/output interface 305 is connected to an input unit 306, an output unit 307, the storage unit 308, and a communication unit 309. In addition, the input/output interface 305 is connected to a drive 310 as necessary. On the drive 310, a removable recording medium, such as a magnetic disk, an optical disk, a magneto-optical disk, or a semiconductor memory is mounted as appropriate. A computer program read from the medium is installed onto the storage unit 308 as necessary.

The input unit 306 includes input devices, such as a touch panel also functioning as a display unit which serves as the output unit 307, a keyboard, a remote control including a light sensitive unit, and a mouse.

The output unit 307 includes a single display unit, such as a display, a single sound output unit, such as a speaker or a headphone output terminal, or the combination of the display unit and the sound output unit.

The storage unit 308 includes, for example, a hard disk. The communication unit 309 includes, for instance, a modem, a terminal adapter, or a radio communication device to control communication with another information processing apparatus.

When the above-described computer is used to construct, for example, the recorder 3, functions of the recorder 3 can be realized by the combinations of the components and programs executed by the CPU 301. For example, the communication unit 309 can acquire restriction information from each surveillance camera 2 connected to the network 1. In addition, according to a program executed by the CPU 301, a function selection GUI window in which after a parameter for one imaging function is selected, selectable parameters for other imaging functions are restricted in accordance with the selected parameter on the basis of the restriction information is output so that the imaging functions to be used can be selected. Furthermore, the communication unit 309 can also acquire image information about a captured image and store the acquired image information in the storage unit 308.

The embodiments of the present invention have been described. The invention is not limited to the above-described embodiments and various modifications based on the technical idea of the invention can be made. For example, the above-described network camera interface is established on the condition that a recorder is compatible with a camera. Upon establishing the connection between the recorder and the camera via a network, the recorder can acquire information from the camera. If the camera is not compatible with the recorder, the above-described setting method can be used. First, specification information (e.g., restriction information), equivalent to the network camera interface, for the camera that is incompatible with the recorder is previously generated and the specification information is loaded into the recorder through a medium, such as a universal serial bus (USB) memory or a CD-R. When the camera is connected to the recorder, the recorder acquires information indicative of the model name of the camera and then determines whether information about the camera is included in camera-specific information provided by the network camera interface. Consequently, the camera can be used as the information about the camera has been obtained using the network camera interface. In this case, information about restriction on functions of the camera is provided in the same case as the network camera interface. Thus, the user can be allowed to perform a simple operation for setting an incompatible camera in the same way as setting a compatible camera. In addition to loading the specification information equivalent to the network camera interface in the recorder through a medium, the specification information may be downloaded from a download site over the network into the recorder.

The present application contains subject matter related to that disclosed in Japanese Priority Patent Application JP 2008-117468 filed in the Japan Patent Office on Apr. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
processing circuitry configured to:
acquire restriction information about imaging functions from an imaging device connected to a network;
control a display to display a setting window in which, after a parameter for a first imaging function is selected, selectable parameters for a second imaging function are restricted in accordance with the selected parameter based on the restriction information so that one or more parameters of the imaging functions to be used are set; and
acquire image information about an image captured using the one or more parameters of the imaging functions via the network,
wherein the imaging functions include plural kinds of different coding methods and plural kinds of resolutions,
wherein a first number of selectable parameters for the second imaging function in a first case of selection of a first parameter for the first imaging function is lower than a second number of selectable parameters for the second imaging function in a second case of selection of a second parameter for the first imaging function,
wherein the information processing apparatus is configured to transmit selected parameters of the first and second imaging functions to the imaging device, and
wherein the first and second imaging functions are dependent on the imaging device.

2. The apparatus according to claim 1, wherein the restriction information describes all of the combinations of settable parameters for the imaging functions.

3. The apparatus according to claim 2, wherein the imaging functions are at least two selected from a moving-image codec, a still-image codec, a moving-image resolution, and a still-image resolution.

4. The apparatus according to claim 1, wherein the processing circuitry is configured to display the parameters for each imaging function as a list.

5. The apparatus according to claim 4, wherein the processing circuitry is configured to display the characters of a selectable parameter in the list such that the color of the characters is different from that of the characters of an unselectable parameter.

6. The apparatus according to claim 1, wherein the processing circuitry is configured to record the image information.

7. The apparatus according to claim 1, wherein the restriction information indicates relationship between plural imaging functions.

8. The apparatus according to claim 1, wherein the acquisition module is configured to acquire the restriction information from plural imaging devices.

9. The apparatus according to claim 1, wherein the information processing apparatus and the imaging device are connected directly to the network.

10. A method for information processing, the method comprising:
   acquiring restriction information about imaging functions from an imaging device connected to a network;
   displaying a setting window in which, after a parameter for a first imaging function is selected, selectable parameters for a second imaging function are restricted in accordance with the selected parameter based on the restriction information so that one or more parameters of the imaging functions to be used are set; and
   acquiring image information about an image captured using the one or more parameters of the imaging functions via the network,
   wherein the imaging functions include plural kinds of different coding methods and plural kinds of resolutions,
   wherein a first number of selectable parameters for the second imaging function in a first case of selection of a first parameter for the first imaging function is lower than a second number of selectable parameters for the second imaging function in a second case of selection of a second parameter for the first imaging function,
   wherein the method further comprises transmitting selected parameters of the first and second imaging functions to the imaging device, and
   wherein the first and second imaging functions are dependent on the imaging device.

11. A non-transitory computer-readable storage medium encoded with computer program instructions, which when executed by a computer, cause the computer to implement a method of registering and setting the capabilities of an imaging device, the method comprising:
   acquiring restriction information about imaging functions from an imaging device connected to a network;
   displaying a setting window in which, after a parameter for a first imaging function is selected, selectable parameters for a second imaging function are restricted in accordance with the selected parameter based on the restriction information so that one or more parameters of the imaging functions to be used are set; and
   acquiring image information about an image captured using the one or more parameters of the imaging functions via the network,
   wherein the imaging functions include plural kinds of different coding methods and plural kinds of resolutions,
   wherein a first number of selectable parameters for the second imaging function in a first case of selection of a first parameter for the first imaging function is lower than a second number of selectable parameters for the second imaging function in a second case of selection of a second parameter for the first imaging function,
   wherein the method further comprises transmitting selected parameters of the first and second imaging functions to the imaging device, and
   wherein the first and second imaging functions are dependent on the imaging device.

12. A system comprising:
   memory; and
   a processor configured to:
   acquire restriction information about imaging functions from an imaging device;
   control a display to display a setting window in which after a parameter for a first imaging function is selected, selectable parameters for a second imaging function are restricted in accordance with the selected parameter based on the restriction information so that one or more parameters of the imaging functions to be used are set; and
   acquire image information about a captured image using the one or more parameters of the imaging functions,
   wherein the imaging functions include plural kinds of different coding methods and plural kinds of resolutions,
   wherein a first number of selectable parameters for the second imaging function in a first case of selection of a first parameter for the first imaging function is lower than a second number of selectable parameters for the second imaging function in a second case of selection of a second parameter for the first imaging function,
   wherein the system sends selected parameters of the first and second imaging functions to the imaging device, and
   wherein the first and second imaging functions are dependent on the imaging device.

13. The system according to claim 12, wherein the restriction information describes all of the combinations of settable parameters for the imaging functions.

14. The system according to claim 13, wherein the imaging functions are at least two selected from a moving-image codec, a still-image codec, a moving-image resolution, and a still-image resolution.

15. The system according to claim 12, wherein the processor is configured to display the parameters for each imaging function as a list.

16. The system according to claim 15, wherein the processor is configured to display the characters of a selectable parameter in the list such that the color of the characters is different from that of the characters of an unselectable parameter.

17. The system according to claim 12, wherein the processor is configured to record the image information.

18. The system according to claim 12, further comprising: the imaging device.

* * * * *